(12) United States Patent
Uzaki et al.

(10) Patent No.: US 11,344,817 B2
(45) Date of Patent: May 31, 2022

(54) CHAT SYSTEM, CHAT DISPLAY METHOD, RECORDING MEDIUM, AND CHAT TERMINAL DEVICE

(71) Applicant: JVCKENWOOD Corporation, Yokohama (JP)

(72) Inventors: Jiro Uzaki, Yokohama (JP); Mizuki Ohara, Yokohama (JP); Naoyuki Okada, Yokohama (JP); Shun Tanaka, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 17/008,674

(22) Filed: Sep. 1, 2020

(65) Prior Publication Data
US 2021/0060444 A1 Mar. 4, 2021

(30) Foreign Application Priority Data

Sep. 3, 2019 (JP) .............................. JP2019-160653
Sep. 20, 2019 (JP) .............................. JP2019-171571
Sep. 20, 2019 (JP) .............................. JP2019-171925

(51) Int. Cl.
*A63F 13/87* (2014.01)
*A63F 13/46* (2014.01)
*A63F 13/44* (2014.01)

(52) U.S. Cl.
CPC .............. *A63F 13/87* (2014.09); *A63F 13/44* (2014.09); *A63F 13/46* (2014.09); *A63F 2300/1012* (2013.01)

(58) Field of Classification Search
CPC .............. A63F 13/87; H04N 21/44218; H04N 21/4788
See application file for complete search history.

(56) References Cited

U.S. PATENT DOCUMENTS

| 8,821,297 | B1 * | 9/2014 | Nagata | A63F 13/332 463/42 |
| 2012/0309542 | A1 * | 12/2012 | Nogami | A63F 13/12 463/42 |
| 2018/0078862 | A1 * | 3/2018 | Schleicher | A63F 13/86 |
| 2018/0343136 | A1 * | 11/2018 | Onoda | H04L 51/04 |

FOREIGN PATENT DOCUMENTS

JP 2015-071076 4/2015

\* cited by examiner

*Primary Examiner* — Seng H Lim
(74) *Attorney, Agent, or Firm* — Amin, Turocy & Watson, LLP

(57) ABSTRACT

A chat system includes a chat server and a chat terminal device. The chat server acquires input information of at least one subject among participants of a game and spectators of the game, generates situation chat data, stores, in a storage unit, the generated situation chat data in association with a time, generates, upon storing the situation chat data, excitement information based on the input information acquired at a time corresponding to a time at which the situation chat data is stored in the storage unit, stores, in the storage unit, the excitement information in association with the situation chat data, and transmits, to a chat terminal device, the situation chat data and the excitement information. The chat terminal device acquires the chat data and the excitement information from the chat server and causes a display to display the acquired chat data and excitement information in an associated manner.

5 Claims, 20 Drawing Sheets

FIG.2

| INPUT ID | INPUTTER ID | INPUT CONTENT | TAG INFORMATION |
|---|---|---|---|
| C054 | 999 | BATTER 007 HITS BALL TO CENTER FIELD IN BOTTOM OF EIGHTH INNING | TC0054 |
| C055 | 052 | ○○○ | TC0055 |
| C056 | 017 | △△△ | TC0056 |
| C057 | 038 | ××× | TC0057 |
| C058 | 999 | BATTER 008 HITS HOME RUN IN BOTTOM OF EIGHTH INNING | TC0058 |
| C059 | 052 | □□□ | TC0059 |
| C060 | 038 | ○△○ | TC0060 |
| C061 | 017 | △□× | TC0061 |
| ⋮ | ⋮ | ⋮ | ⋮ |

FIG.3

| TAG INFORMATION | PROCESSING TIME INFORMATION |
|---|---|
| TC0054 | 10:03:05 |
| TC0055 | 10:03:10 |
| TC0056 | 10:03:14 |
| TC0057 | 10:06:37 |
| TC0058 | 10:08:12 |
| TC0059 | 10:08:17 |
| TC0060 | 10:09:20 |
| TC0061 | 10:09:25 |
| ⋮ | ⋮ |

FIG.4

| BIOLOGICAL INFORMATION | EXCITEMENT INFORMATION | TAG INFORMATION |
|---|---|---|
| V1 | 80 | TC0054 |
| V2 | 40 | TC0055 |
| V3 | 20 | TC0056 |
| V4 | 30 | TC0057 |
| V5 | 80 | TC0058 |
| V6 | 40 | TC0059 |
| V7 | 20 | TC0060 |
| V8 | 20 | TC0061 |
| ⋮ | ⋮ | ⋮ |

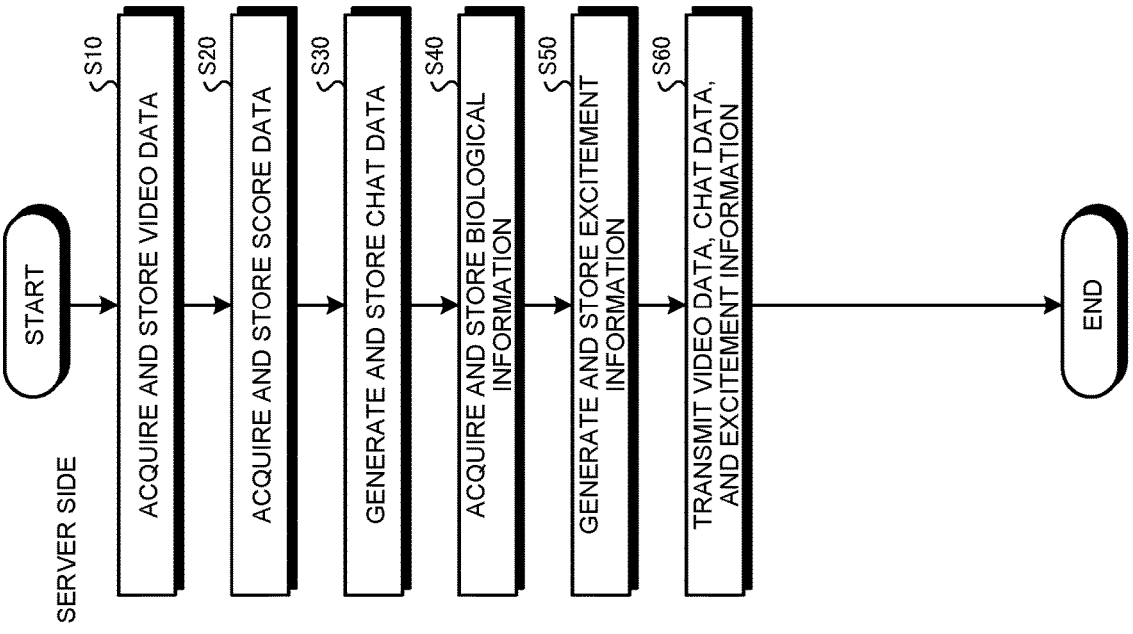
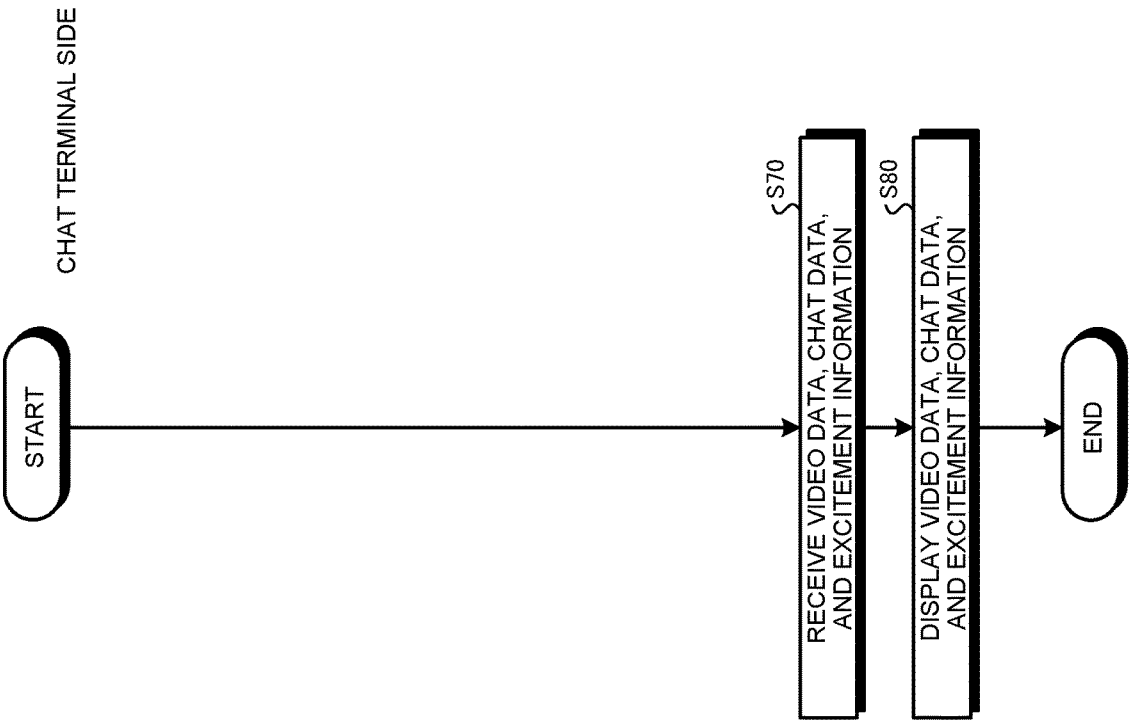

FIG.16

| INPUT ID | INPUTTER ID | INPUT CONTENT | COMMENT INFORMATION | TAG INFORMATION |
|---|---|---|---|---|
| C054 | 999 | BATTER 007 HITS BALL TO CENTER FIELD IN BOTTOM OF EIGHTH INNING | | TC0054 |
| C055 | 052 | ○○○ | C054 | TC0055 |
| C056 | 017 | △△△ | C054 | TC0056 |
| C057 | 038 | ××× | | TC0057 |
| C058 | 999 | BATTER 008 IS STRUCK OUT IN BOTTOM OF EIGHTH INNING | | TC0058 |
| C059 | 052 | □□□ | C058 | TC0059 |
| C060 | 038 | ○△○ | | TC0060 |
| C061 | 017 | △□× | | TC0061 |
| | | | | |

FIG.17

| TAG INFORMATION | UPLOAD TIME |
|---|---|
| TC0054 | 10:03:05 |
| TC0055 | 10:03:21 |
| TC0056 | 10:03:55 |
| TC0057 | ⋮ |
| TC0058 | 10:08:12 |
| TC0059 | 10:08:55 |
| TC0060 | 10:09:20 |
| TC0061 | 10:09:25 |
| ⋮ | ⋮ |

| PHRASE | PRIORITY | PHRASE | PRIORITY |
|---|---|---|---|
| YEAH! | 1 | IT'S UNFORTUNATE | 1 |
| CONGRATULATIONS! | 2 | IT'S SCREWED UP | 2 |
| THAT'S GREAT | 3 | MAYBE NEXT TIME | 3 |
| ⋮ | | ⋮ | |

CHAT SYSTEM, CHAT DISPLAY METHOD, RECORDING MEDIUM, AND CHAT TERMINAL DEVICE

CROSS-REFERENCE TO RELATED APPLICATIONS

This application claims priority from Japanese Application No. 2019-160653, filed on Sep. 3, 2019, Japanese Application No. 2019-171571, filed on Sep. 20, 2019, and Japanese Application No. 2019-171925, filed on Sep. 20, 2019, the contents of which are incorporated by reference herein in its entirety.

BACKGROUND OF THE INVENTION

1. Field of the Invention

The present invention relates to a chat system, a chat display method, a recording medium, and a chat terminal device.

2. Description of the Related Art

When a game such as a sports competition or a game competition is held, for example, a chat has been used to report a game situation or the like, or a video captured by a camera has been distributed, such that even a person who cannot participate in the game or cannot directly watch the game can grasp the game situation (for example, see JP 2015-71076 A).

With a technology described in JP 2015-71076 A, it is possible to grasp information corresponding to a score, but it is difficult to grasp what scene in the game was excited. Further, pieces of chat data that are input for the purpose of replying to one piece of chat data are also displayed in time series, which makes it difficult to understand a relationship between pieces of chat data. Therefore, there has been a demand for a configuration that allows a user to easily grasp information.

SUMMARY OF THE INVENTION

According to one aspect of the present disclosure, a chat system includes a chat server and a chat terminal device. The chat server includes a game situation data acquisition unit, an input information acquisition unit, a chat data processor, a storage unit, an excitement information generation unit, and a server communication unit. The game situation data acquisition unit acquires game situation data indicating a situation of a game. The input information acquisition unit acquires input information individually input for at least one subject among participants of the game and spectators of the game. The chat data processor generates, in response to acquiring the game situation data, situation chat data which is chat data having a content corresponding to the game situation data. The storage unit stores therein the situation chat data generated by the chat data processor in association with a time. The excitement information generation unit generates, in response to storing the situation chat data in the storage unit, excitement information that indicates a degree of excitement in the game based on the input information acquired at a time corresponding to a time at which the situation chat data is stored in the storage unit, and stores, in the storage unit, the excitement information in association with the situation chat data. The server communication unit is configured to transmit, to the chat terminal device, the situation chat data stored in the storage unit and the excitement information corresponding to the situation chat data. The chat terminal device includes a communication unit and a control unit. The communication unit acquires the chat data and the excitement information from the chat server. The control unit causes a display to display the acquired chat data and excitement information in an associated manner.

According to another aspect of the present disclosure, a chat display method includes: acquiring, by a chat server, game situation data that indicates a situation of a game; acquiring, by the chat server, input information individually input for at least one subject among participants of the game and spectators of the game; generating, by the chat server, in response to acquiring the game situation data, situation chat data which is chat data having a content corresponding to the game situation data; storing, by the chat server, in a storage unit, the generated situation chat data in association with a time; generating, by the chat server, in response to storing the situation chat data in the storage unit, excitement information that indicates a degree of excitement in the game based on the input information acquired at a time corresponding to a time at which the situation chat data is stored in the storage unit, and storing, in the storage unit, the excitement information in association with the situation chat data; and transmitting, by the chat server, to a chat terminal device, the situation chat data stored in the storage unit and the excitement information corresponding to the situation chat data; acquiring, by the chat terminal device, the chat data and the excitement information from the chat server; and causing, by the chat terminal device, a display to display the acquired chat data and excitement information in an associated manner.

According to still another aspect of the present disclosure, a recording medium contains a chat data processing program. The chat data processing program causes a chat server to perform: acquiring game situation data that indicates a situation of a game; acquiring input information individually input for at least one subject among participants of the game and spectators of the game; generating, in response to acquiring the game situation data, situation chat data which is chat data having a content corresponding to the game situation data; storing, in a storage unit, the generated situation chat data in association with a time; generating, in response to storing the situation chat data in the storage unit, excitement information that indicates a degree of excitement in the game based on the input information acquired at a time corresponding to a time at which the situation chat data is stored in the storage unit, and storing, in the storage unit, the excitement information in association with the situation chat data; and transmitting, to a chat terminal device, the situation chat data stored in the storage unit and the excitement information corresponding to the situation chat data. The chat data processing program causes the chat terminal device to perform: acquiring the chat data and the excitement information from the chat server; and causing a display to display the acquired chat data and excitement information in an associated manner.

Additional aspects, objects, embodiments and advantages of the present teachings will become apparent upon reading the following detailed description in view of the appended drawings and claims.

BRIEF DESCRIPTION OF THE DRAWINGS

FIG. 2 is a diagram illustrating an example of chat data stored in a storage unit;

FIG. 3 is a diagram illustrating an example of synchronization data stored in the storage unit;

FIG. 4 is a diagram illustrating an example of excitement information stored in the storage unit;

FIGS. 9A and 9B are flowcharts illustrating an example of a chat display method according to the first embodiment;

FIG. 16 is a diagram illustrating an example of chat data stored in a chat data storage unit;

FIG. 17 is a diagram illustrating an example of synchronization data stored in a synchronization data storage unit;

FIG. 18 is a diagram illustrating an example of pieces of candidate data stored in a candidate data storage unit;

DETAILED DESCRIPTION OF THE PREFERRED EMBODIMENTS

Hereinafter, embodiments of the present invention will be described with reference to the drawings. Note that the present invention is not limited to these embodiments. Further, components in the following embodiments include those that can be easily replaced by those skilled in the art, or those that are substantially the same.

First Embodiment

Figure 1:
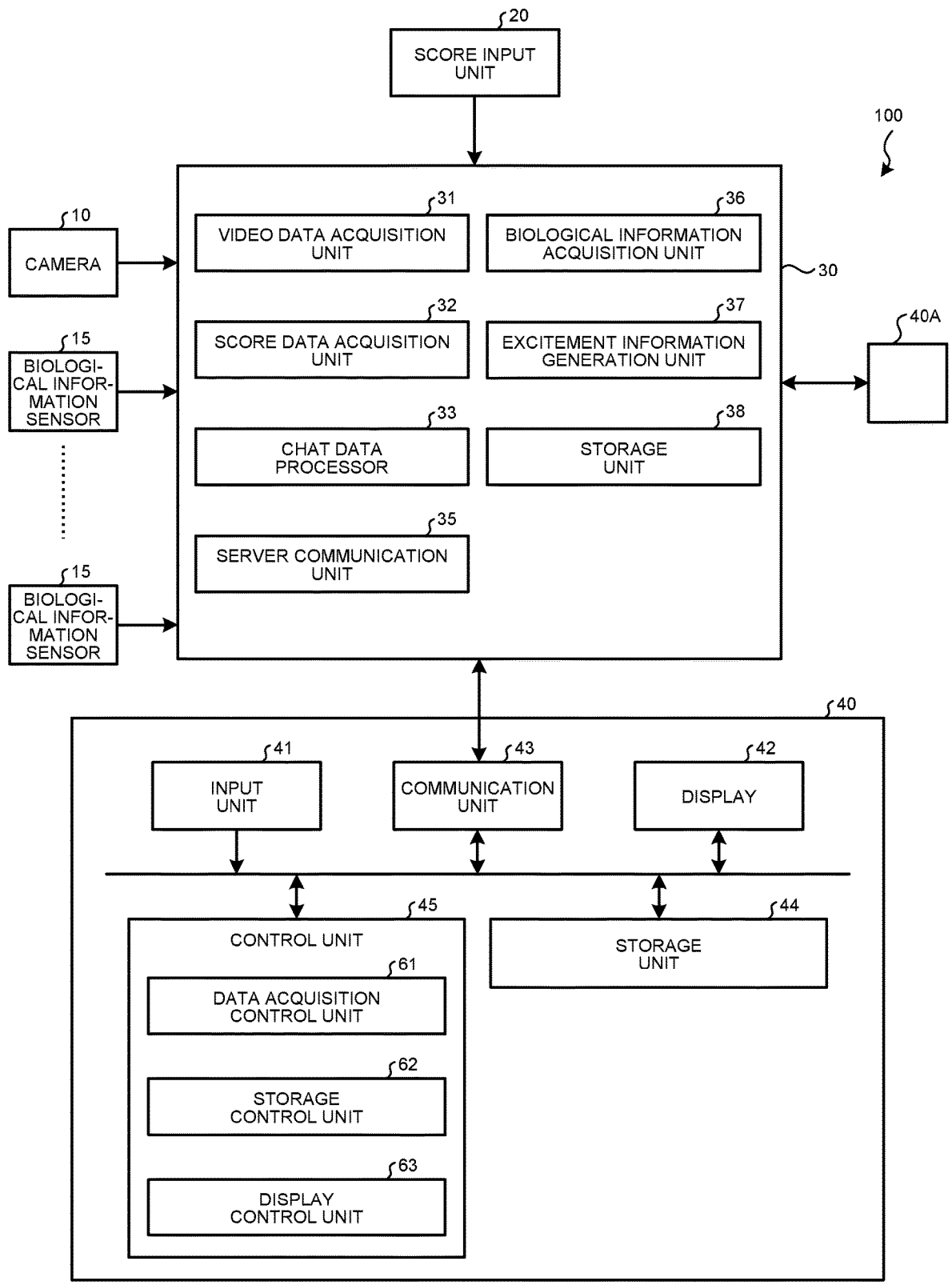
FIG. 1 is a block diagram illustrating an example of a chat system according to a first embodiment.

FIG. 1 is a block diagram illustrating an example of a chat system 100 according to a first embodiment. The chat system 100 illustrated in FIG. 1 is used when chatting about a content of a game in a sports competition such as a baseball game, for example. By using the chat system 100, it is possible to report a game situation and the like by using a chat so that even a person who cannot participate in the game or directly watch the game can grasp the game situation. In the following, a baseball game will be described as an example of the sports competition, but the present invention is not limited thereto and the same description can be applied to other sports competitions such as a soccer game, a volleyball game, a tennis game, and a badminton game. Further, the chat system 100 is also adaptable to competitions such as a dance contest (dancing competition), a piano contest (performance competition), a karuta competition (card game competition or table game competition), a karaoke contest (singing competition), and a game contest, other than the sports competitions.

As illustrated in FIG. 1, the chat system 100 includes a camera 10, a biological information sensor 15, a score input unit 20, a server 30, and chat terminal devices 40 and 40A. The camera 10 captures a content of the game in a game site, for example. Video data captured by the camera 10 is transmitted to, for example, the server 30 and managed by the server 30. The number of cameras 10 is plural, for example. Further, the camera 10 may be any camera as long as it can capture video data. The camera 10 may be, for example, a camera embedded in a mobile phone, a smartphone, or the like. When the camera 10 captures video data, the camera 10 includes data indicating a capturing time in the video data.

The biological information sensor 15 detects biological information of at least one subject among participants participating in the game or spectators watching the game. The spectator may include a person who watches the game with the chat terminal devices 40 or 40A. Examples of the biological information include a heart rate, a respiration rate, a blood pressure, a body temperature, brain waves, a sweat rate, a body motion, and oxygen saturation of arterial blood of the subject. The biological information sensor 15 can detect at least one of these biological information. Note that the biological information sensor 15 may be, for example, any one of a heart rate monitor, a respirometer, a blood pressure gauge, a thermometer, a pulse oximeter, or an acceleration sensor, or a combination thereof. The biological information sensor 15 can be attached so that biological information can be input in a state in which the biological information sensor 15 is in contact with, for example, a participant or a spectator of the game. Note that a configuration in which biological information of the subject is detected by performing predetermined image recognition based on an image of the subject that is captured by the camera 10 or the like may be possible.

The score input unit 20 inputs game situation data indicating a situation of the game to the server 30. In the present embodiment, examples of game situation data indicating a situation of a baseball game can include score data. The score data is data that constitutes a score described in a baseball score book, and is an individual event that constitutes a series of events starting from a pitch of a pitcher. The score is a set of score data. Therefore, each time the pitcher throws one ball, a plurality of pieces of score data are created, such that one score is created. For example, in a case where a result of batting in a state in which a runner is on first base is a fly out to right and the first base runner is also tagged out, score data indicating that the batter is out, score data indicating a fly to right, and score data indicating that the first base runner is out are created, and one score is constituted by these pieces of score data.

In addition to the score data described above, score data such as an action of the batter, an action of a fielder, determination of a count, a state of an advancement of a runner when there is already a runner on base, and other play of batters or fielders can be included in the score. Specifically, the score can include score data such as a strike, a ball, a foul, a batting result, a type of batted ball, a catching fielder, or an advancement result. The batting result is information such as out, a single, a double, a triple, or a home run. The type of batted ball is information such as a ground ball, a line drive, a fly ball, or a bunt, and may be categorized into more types. The catching fielder is information for specifying a fielder who actually caught the batted ball or a defensive position of the fielder. The advancement result is information regarding an advancement of a runner on base, such as "from first base to second base", and can include other play of batters and fielders.

Examples of the score input unit 20 can include an application for inputting the above score data into the server 30 as electronic data. In this case, the score input unit 20 may be provided in a processing device such as a personal computer installed outside the server 30. Alternatively, the score input unit 20 may be provided in the server 30. Note that, in the present embodiment, the score input unit 20 need not necessarily be provided.

The server 30 comprehensively manages the chat system 100. The server 30 includes various applications, data, programs, and the like for managing the chat system 100. As the server 30, for example, a personal computer, a workstation or the like is used, but the present invention is not limited thereto.

A plurality of chat groups are set in the server 30. Each of the chat groups is individually set for each competition, each game, or each team, for example. The server 30 performs various processing to be described below for each chat group.

The server 30 includes a video data acquisition unit 31, a score data acquisition unit 32, a chat data processor 33, a server communication unit 35, an input information acquisition unit 36, an excitement information generation unit 37, and a storage unit 38.

The video data acquisition unit 31 acquires video data captured by the plurality of cameras 10. The video data acquisition unit 31 stores the acquired video data in the storage unit 38. The score data acquisition unit 32 acquires score data input through the score input unit 20 as game situation data. The score data acquisition unit 32 stores the score data in the storage unit 38 in association with an input time when the score data is input.

As the server 30 stores video data and chat data, the video data and the chat data are uploaded to the server 30. When the chat data is stored, the server 30 includes, in the chat data, data indicating a time (hereinafter, referred to as upload time) when the chat data is stored. That is, the chat data uploaded to the server 30 includes the data indicating the upload time. The server 30 includes a management application that manages the video data and the chat data.

The chat data processor 33 stores the chat data input through the chat terminal device 40 in the storage unit 38. Further, when the score data acquisition unit 32 acquires the score data, the chat data processor 33 generates chat data (situation chat data) having a content corresponding to the score data. In this case, the chat data processor 33 can generate chat data that expresses a content of the score data with characters, for example. Accordingly, when the score data is updated, the updated score data can be checked as chat information.

The server communication unit 35 can perform communication with the chat terminal device 40. The server communication unit 35 can transmit, for example, the chat data and the video data stored in the storage unit 38.

The input information acquisition unit 36 can acquire input information individually input for at least one subject among participants of the game and spectators of the game. In the present embodiment, the input information acquisition unit 36 acquires biological information that is a detection result of the biological information sensor 15. Hereinafter, in the present embodiment, biological information will be described as an example of the input information, but the input information is not limited to the biological information. It is sufficient that the input information is information that is individually input for at least one among participants of the game and spectators of the game, and for example, the input information may be information directly input as excitement information by a spectator of the game through the chat terminal device 40 or the like. The input information acquisition unit 36 can maintain a state in which the biological information of the subject is acquired during a game, for example, and extract and output the biological information at a predetermined timing. Therefore, for example, the input information acquisition unit 36 can extract the biological information at a time corresponding to the upload time of the situation chat data from the acquired biological information, and output the biological information. In addition, the input information acquisition unit 36 can also extract, from the acquired biological information, for example, an average value of the biological information in a period from the upload time of the situation chat data until a predetermined time elapses, and output the average value. As the predetermined time, for example, a fixed time may be set, or a time taken until the next situation chat data (or the next chat data) is uploaded may be set.

The excitement information generation unit 37 generates excitement information based on the input information acquired by the input information acquisition unit 36. The excitement information is information indicating a degree of excitement in the game. The excitement information can be represented by a numerical value, for example. In a case where the biological information is acquired as the input information, a numerical value indicating a degree of excitement can be calculated based on, for example, a fluctuation of each value of a heart rate, a respiration rate, a blood pressure, a body temperature, brain waves, a sweat rate, a motion of the body of the subject, and oxygen saturation of arterial blood. For example, it can be estimated that the greater the fluctuation of each value, the higher the degree of excitement of the subject who is a target of the biological information acquisition. Therefore, it is possible to perform a setting so that the greater the fluctuation of each value of the detection result is, the higher the calculated value of excitement information is. Note that the excitement information is not limited to a positive numerical value (indicating excitement), but may include a negative numerical value (indicating depression).

The storage unit 38 stores the plurality of pieces of video data acquired by the video data acquisition unit 31, the score data acquired by the score data acquisition unit 32, the chat data processed by the chat data processor 33, and the excitement information acquired by the excitement information generation unit 37. The video data includes data indicating a video captured in a baseball game. The video data includes data indicating a captured time when the video of the game is captured.

FIG. 2 is a diagram illustrating an example of the chat data stored in the storage unit 38. As illustrated in FIG. 2, the chat data includes an input ID 75, an inputter ID 76, an input content 77, and tag information 78.

One input ID 75 is created each time the chat data is input to or generated in the server 30. The inputter ID 76 is information for identifying an inputter of one piece of chat data. For example, in a case of the situation chat data generated by the server 30, the inputter ID 76 may be a predetermined value (for example, "999" or the like). The input content 77 is information indicating a content of a message displayed in a chat display region 42b of the chat terminal device 40 to be described later. The input content 77 includes, for example, character data or predetermined illustration data.

The storage unit 38 stores therein synchronization data that associates score data with chat data. FIG. 3 is a diagram illustrating an example of the synchronization data stored in the storage unit 38. As illustrated in FIG. 3, the synchronization data includes tag information 79 and processing time information 80. The tag information 79 is information corresponding to the tag information 78 of the chat data described above. The tag information 79 is arranged in the order according to the processing time information 80. For example, the same tag number (TC0054, TC0055, . . . , or TC0061) as the corresponding tag information 78 is given to the tag information 79, but the present invention is not limited thereto. The processing time information 80 is information associated with the tag information 79, and is information indicating a processing time of chat data. The processing time of the chat data can be, for example, an upload time when the chat data is uploaded to the server 30. Further, the processing time of the chat data can be an input start time when input of the chat data is started. With the tag information 79 and the processing time information 80, the score data and the chat data are stored in association with each other based on the captured time and the processing time.

The storage unit 38 stores the excitement information in association with the chat data. FIG. 4 is a diagram illustrating an example of the excitement information stored in the storage unit 38. As illustrated in FIG. 4, the storage unit 38 stores biological information 73, excitement information 74, and tag information 72 in association with one another. The biological information 73 indicates a detection result of the biological information sensor 15 at a time when the chat data is input. The excitement information 74 is information calculated based on the biological information 73, and is information that indicates a degree of excitement of the game by using a numerical value. In the example illustrated in FIG. 4, a value of the excitement information is large at a time when a batter 007 hits a ball to center field and a time when a batter 008 hits a home run. The tag information 72 is information for identifying chat data. The tag information 72 corresponds to the tag information 78 of the chat data and the tag information 79 of the synchronization data, and tag numbers (TC0054, TC0055, . . . ) are given in ascending order as indexes.

In addition, the storage unit 38 stores therein a chat data processing program. The chat data processing program causes the server 30 to perform: acquiring game situation data that indicates a situation of a game; acquiring input information individually input for at least one subject among participants of the game and spectators of the game; generating, in response to acquiring the game situation data, situation chat data which is chat data having a content corresponding to the game situation data; storing, in the storage unit 38, the generated situation chat data in association with a time; generating, in response to storing the situation chat data in the storage unit 38, excitement information that indicates a degree of excitement in the game based on the input information acquired at a time corresponding to a time at which the situation chat data is stored in the storage unit 38, and storing, in the storage unit 38, the excitement information in association with the situation chat data; and transmitting, to each of the chat terminal devices 40 and 40A, the situation chat data stored in the storage unit 38 and the excitement information corresponding to the situation chat data. The chat data processing program further causes each of the chat terminal devices 40 and 40A to perform: acquiring chat data and excitement information from the server 30; and causing a display to display the acquired chat data and excitement information in an associated manner.

The chat terminal devices 40 and 40A each include an input unit 41, a display 42, a communication unit 43, a storage unit 44, and a control unit 45. The input unit 41, the display 42, the communication unit 43, the storage unit 44, and the control unit 45 are connected via, for example, a bus line. Examples of the chat terminal device 40 include a mobile information terminal such as a mobile phone, a smartphone, a tablet PC, or a laptop personal computer.

Through the input unit 41, a predetermined input operation for inputting information such as chat data can be performed. The input unit 41 outputs an instruction signal for the control unit 45 according to an input operation. An input device such as a touch panel is used as the input unit 41. Note that, as the input unit 41, a button, a lever, a dial, a switch, or another input device may be used, in addition to or instead of the touch panel. The input unit 41 outputs an instruction signal according to a predetermined input operation. The display 42 displays various information including a character and an image. The display 42 includes a display panel such as a liquid crystal panel. The display 42 can display information including a video.

Figure 5:
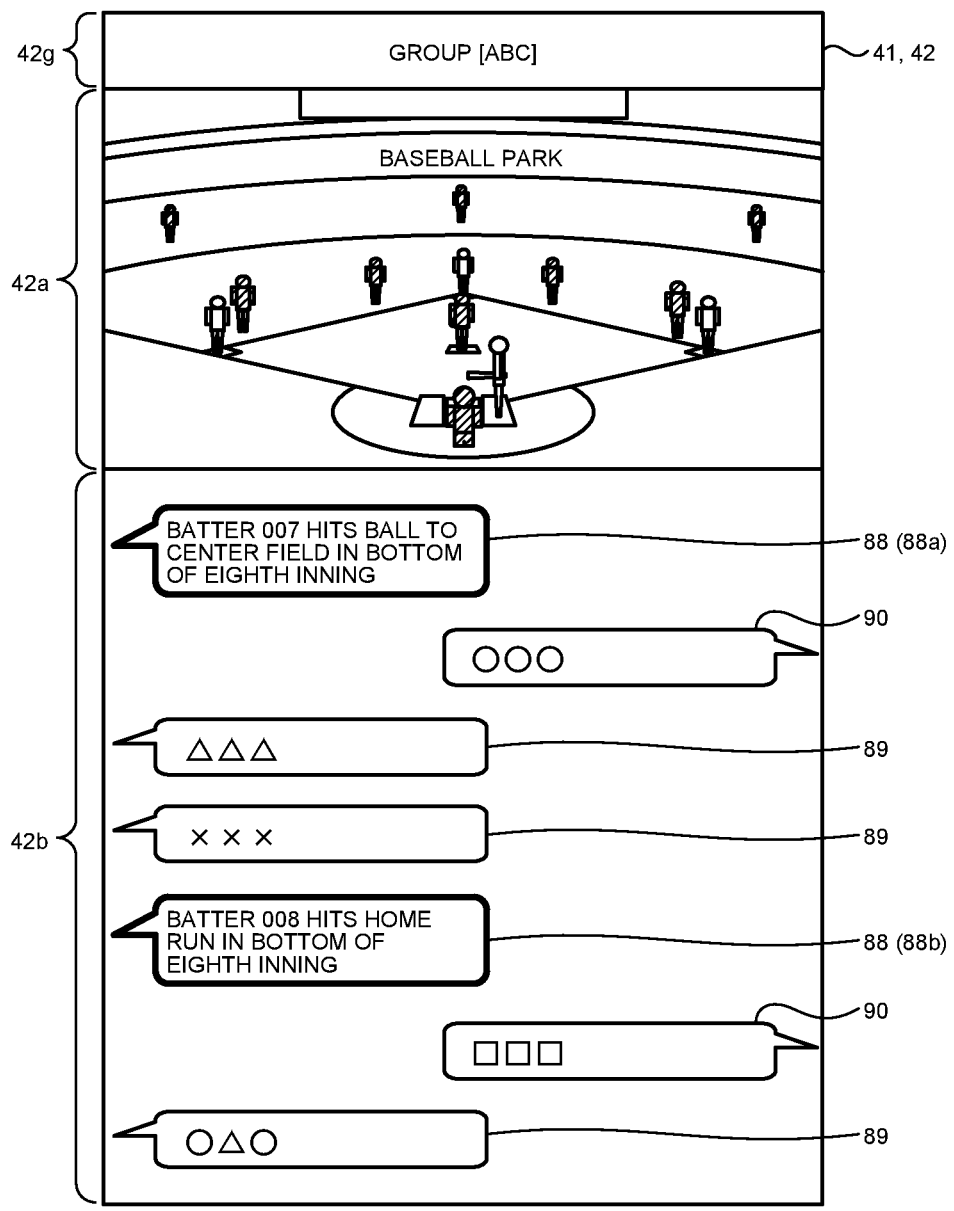
FIG. 5 is a diagram illustrating an example of an input unit and a display of a chat terminal device according to the present embodiment.

FIG. 5 is a diagram illustrating an example of the input unit 41 and the display 42 of the chat terminal device 40 according to the present embodiment. As illustrated in FIG. 5, the chat terminal device 40 includes, for example, the touch panel type input unit 41 and the display 42. That is, a touch panel as the input unit 41 is arranged so as to overlap with a display panel as the display 42.

The display 42 displays, for example, a video display region 42a, a chat display region 42b, and a group display region 42g. Video data is displayed in the video display region 42a. Note that a scroll bar or the like for selecting a reproduction time of the video data may be displayed in the video display region 42a.

Chat data is displayed in the chat display region 42b. For example, in the chat display region 42b, a server message 88 which is situation chat data generated by the server 30, other's message 89 which is chat data input through another chat terminal device 40A different from the chat terminal device 40, a user's message 90 which is chat data input through the chat terminal device 40, or the like is displayed. The server message 88 indicates a content of score data input to the server 30, for example, in a form of text. A server message 88a on the upper side of FIG. 5 has a content indicating that, for example, the batter 007 hit a ball to center field in the bottom of the eighth inning. Further, a server message 88b on the lower side of FIG. 5 has a content indicating that a batter 008 hit a home run in the bottom of the eighth inning.

Note that the server message 88 and the other's message 89 are displayed in an area on the left side of the chat display region 42b, for example. Further, the user's message 90 is displayed in an area on the right side of the chat display region 42b, for example. Further, the server message 88 and the other's message 89 may be displayed in a distinguishable form. For example, the type of a frame in which each message is displayed may be different for each message. As a result, the server message 88 and the other's message 89 can be distinguished. Information on a group to which an operator of the chat terminal device 40 belongs is displayed in the group display region 42g. Further, the server message 88, the other's message 89, and the user's message 90 are displayed in a frame such as a speech balloon. For example, as the number of characters is increased, dimensions of the displayed speech balloon in a left-right direction and a top-bottom direction are increased in the chat display region 42b.

In a case where a touch operation, a scroll operation, or the like is performed on a predetermined region in a surface of the touch panel, the input unit 41 outputs a predetermined instruction signal including position information of the region on which the operation is performed, and an operation content. The position information is set so as to correspond to a position on the display 42, for example. Note that the configurations of the input unit 41 and the display 42 are not limited to the above-described configurations.

The communication unit 43 communicates information with an external device is a wired or wireless manner. The communication unit 43 transmits/receives video data, chat data, score data, biological information, excitement information, and the like to/from the external server 30, for example.

The storage unit 44 includes a storage such as a hard disk drive or a solid state drive. Note that an external storage medium such as a removable disk may be used as the storage unit 44. The storage unit 44 stores an operating system of the chat terminal device 40, various programs for controlling operations of the input unit 41, the display 42, and the communication unit 43, a chat application for chatting, various programs, data, and the like. For example, the storage unit 44 may store frame data such as the video display region 42a, the chat display region 42b, or the group display region 42g to be displayed on the display 42.

The control unit 45 controls each of the input unit 41, the display 42, and the communication unit 43. Further, the control unit 45 performs arithmetic operation, processing, and the like according to the instruction signal from the input unit 41. The control unit 45 includes a processing device such as a central processing unit (CPU), and a storage device such as a random access memory (RAM) and a read only memory (ROM). The control unit 45 includes a communication control unit 61, a storage control unit 62, and a display control unit 63.

The communication control unit 61 accesses the server 30 via the communication unit 43 and transmits/receives information to/from the server 30. For example, the communication control unit 61 receives the chat data, the video data, the score data, the biological information, the excitement information, and the like stored in the storage unit 38 of the server 30.

The storage control unit 62 stores the video data, the chat data, the biological information, and the excitement information acquired from the server 30 in the storage unit 44 in association with one another based on the captured time and the processing time.

The display control unit 63 controls a display content to be displayed on the display 42. The display control unit 63 controls a display content in the video display region 42a based on the video data acquired via the communication unit 43. Further, when a scroll bar for selecting a reproduction time is displayed in the video display region 42a, the display control unit 63 displays video data from the reproduction time selected by using the scroll bar in the video display region 42a.

Further, the display control unit 63 controls a display content in the chat display region 42b based on the chat data acquired via the communication unit 43. When displaying the chat data in the chat display region 42b, the display control unit 63 displays a displayable number of pieces of chat data in the chat display region 42b side by side in one direction in time series based on the upload time. In the present embodiment, for example, as illustrated in FIG. 5, the pieces of chat data are displayed side by side in time series from the upper side to the lower side of the chat display region 42b in the drawing.

In addition, in a case where new chat data is stored in the storage unit 38 of the server 30, the display control unit 63 acquires the latest chat data stored in the storage unit 38 via the communication unit 43, and updates the display content in the chat display region 42b. In this case, the display control unit 63 determines whether a space for displaying new chat data exits below chat data displayed most recently in time series in the chat display region 42b. In a case where the space for displaying new chat data exits, the display control unit 63 displays new chat data in the space. Further, in a case where no space for displaying new chat data exists, the display control unit 63 scrolls the entire chat display region 42b in a direction to push, toward the upper side of the chat display region 42b, the oldest chat data displayed in the chat display region 42b in time series, that is the uppermost chat data displayed in the chat display region 42b. Then, the display control unit 63 displays new chat data in a space on the lower side of the chat display region 42b that is vacated by scrolling. As a result, the display control unit 63 can update the chat data displayed in the chat display region 42b in real time each time new chat data is uploaded to the server 30 and stored in the storage unit 44.

Further, the display control unit 63 can control the display content in the chat display region 42b based on past chat data stored in the storage unit 44. For example, when the operator slides a touch position upward or downward in a state of touching the chat display region 42b of the input unit (touch panel) 41, that is, when the operator performs an operation of manually scrolling the chat display region 42b, the display control unit 63 changes the chat data displayed in the chat display region 42b according to a scroll direction and a scroll amount. For example, when the operator slides the touch position upward, chat data uploaded later than the chat data that is currently displayed is displayed in the chat display region 42b. Further, when the operator slides the touch position downward, chat data uploaded earlier than the chat data that is currently displayed is displayed in the chat display region 42b. Note that a method of changing the chat data displayed in the chat display region 42b is not limited thereto, and another method such as a button, a keyboard, or a mouse may be used.

Figure 6:
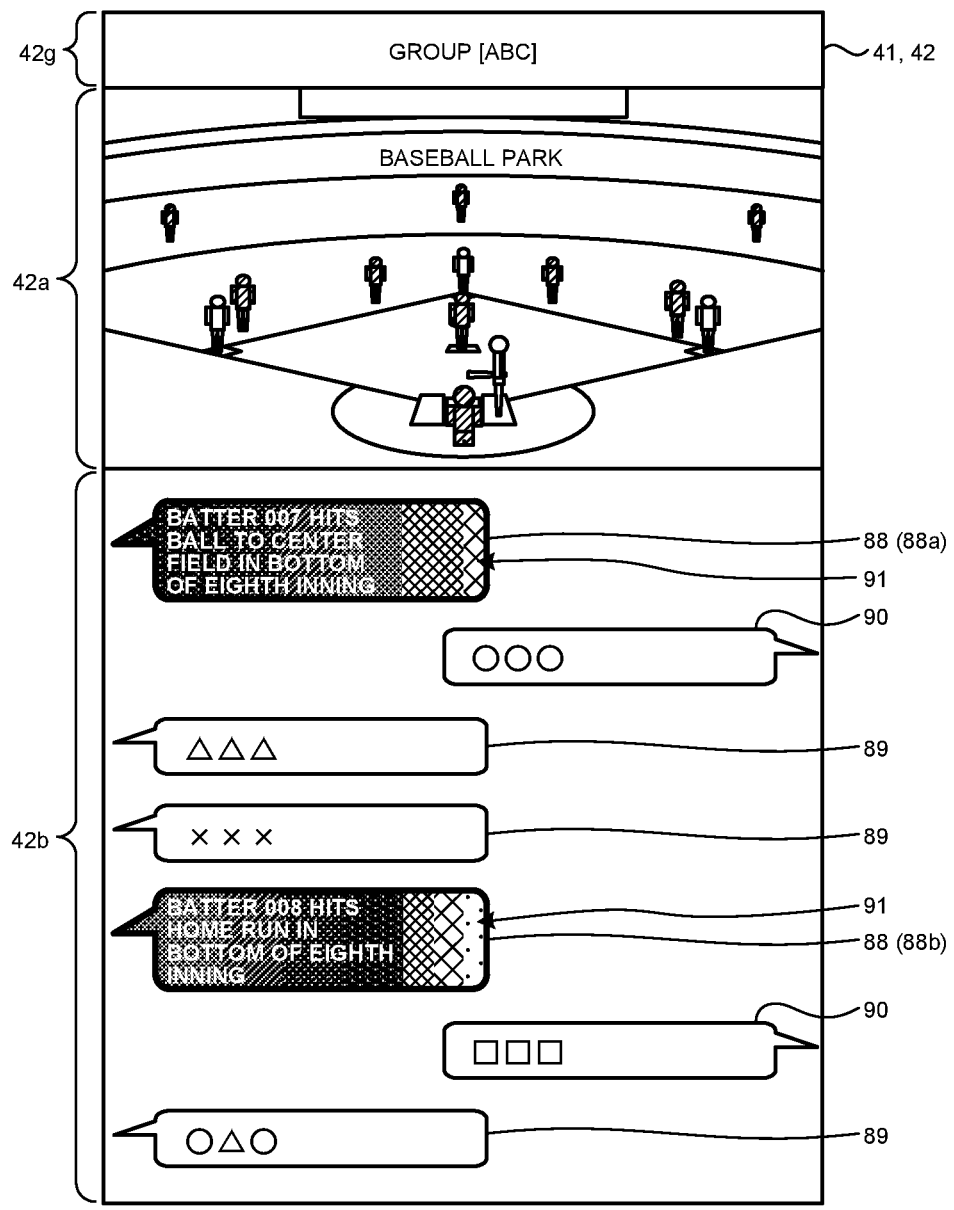
FIG. 6 is a diagram illustrating an example of displaying of a chat display region.

In the present embodiment, the display control unit 63 can display the chat data (the server message 88, the other's message 89, or the user's message 90) and the excitement information in an associated manner in the chat display region 42b. FIG. 6 is a diagram illustrating an example of displaying of the chat display region 42b. For example, in the example illustrated in FIG. 6, the display control unit 63 can display a target region 91, in which the server message 88 is displayed, in the chat display region 42b, in a form corresponding to a value of the excitement information. In this case, a predetermined threshold value (for example, 60) is set in advance. The display control unit 63 displays target regions 91 for the server message 88a and the server message 88b in a form different from other chat data, for example, in a form in which a gradation effect is applied, the server message 88a and the server message 88b corresponding to chat data in which a value of the excitement information is higher than the predetermined threshold value.

Figure 7:
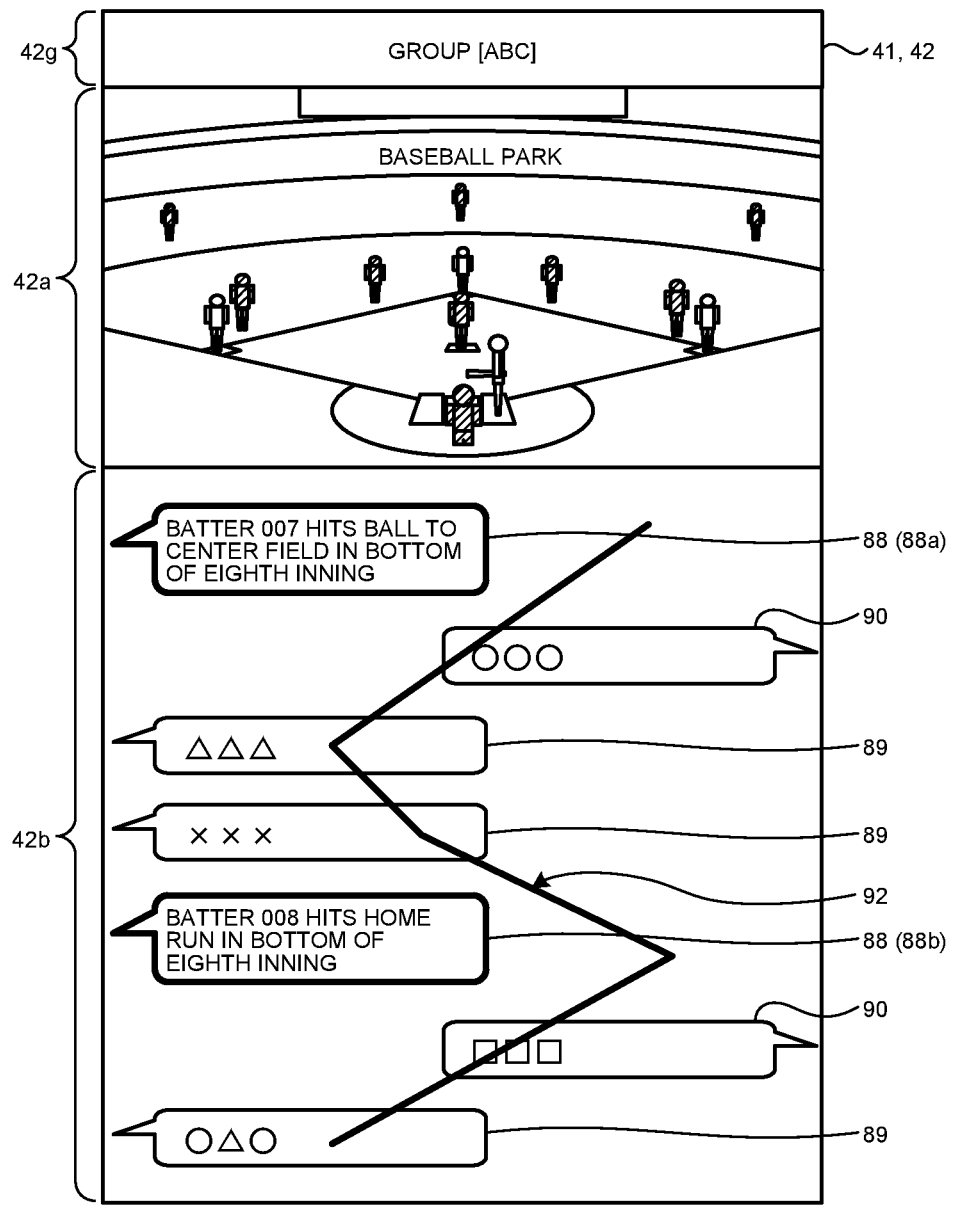
FIG. 7 is a diagram illustrating another example of displaying of the chat display region.

FIG. 7 is a diagram illustrating another example of displaying of the chat display region 42b. As illustrated in FIG. 7, the display control unit 63 may display a line graph 92 according to the value of the excitement information. In this case, the display control unit 63 can arrange folds of the line graph 92 at positions corresponding to pieces of chat data. In the example illustrated in FIG. 6, the value of the excitement information is higher toward the right side.

Figure 8:
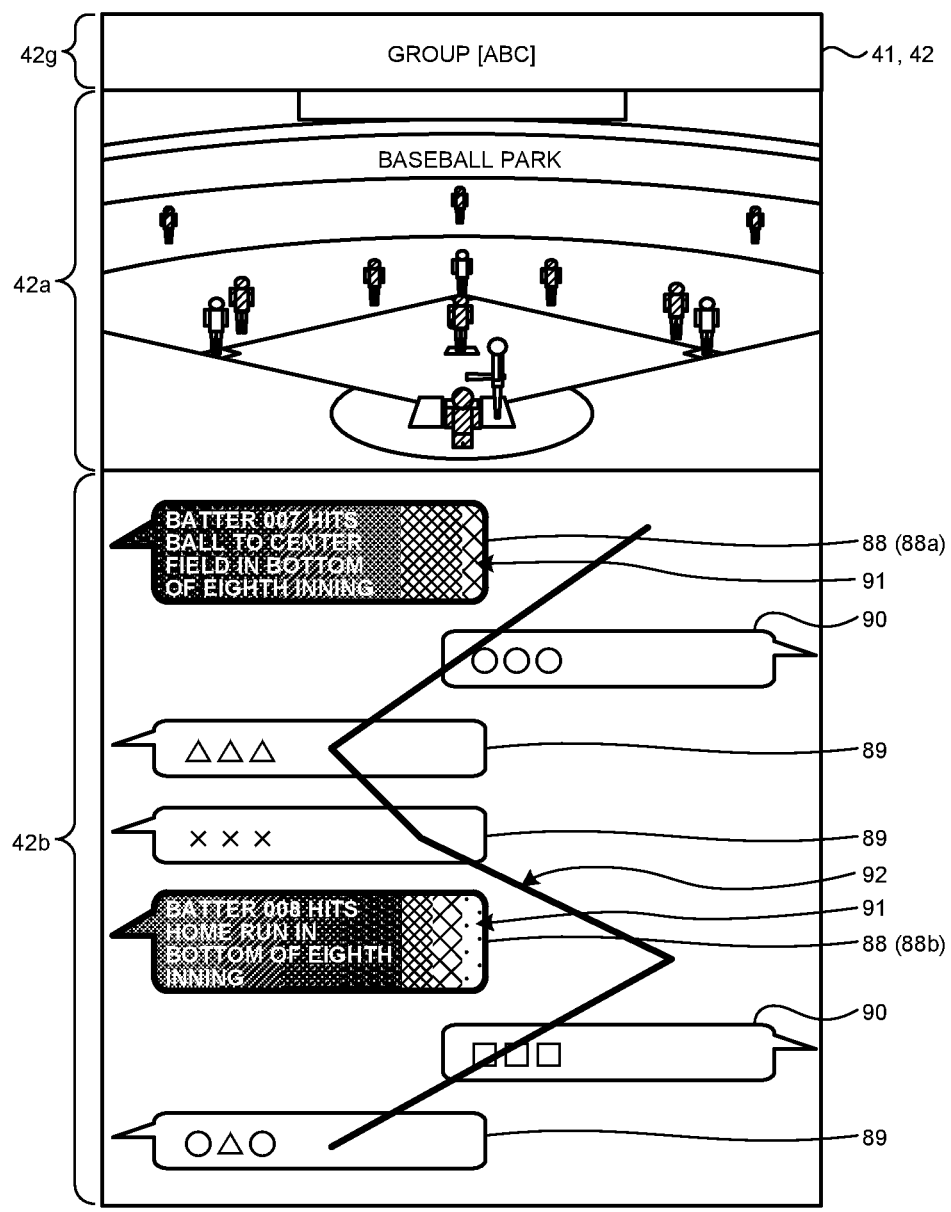
FIG. 8 is a diagram illustrating another example of displaying of the chat display region.

Note that the form in which the excitement information is displayed is not limited to thereto, and the excitement information may be displayed in another form. Further, the display control unit 63 may display the excitement information in a plurality of different forms. FIG. 8 is a diagram illustrating another example of displaying of the chat display region 42b. As illustrated in FIG. 8, the display control unit 63 may display both the gradation effect as illustrated in FIG. 6 and the line graph 92 as illustrated in FIG. 7, for example. In other words, the display control unit 63 may display excitement information so that the target region 91 of the chat data is displayed in a distinguishable form, and further display other excitement information in the chat display region 42b. Further, the display control unit 63 may display the target region 91 of the chat data so that the target region 91 repeatedly contracts and expands like a heartbeat.

Next, an operation of the chat system 100 configured as described above will be described. FIGS. 9A and 9B are flowcharts illustrating an example of a chat display method according to the first embodiment. FIGS. 9A and 9B illustrate a server 30 side flowchart and a chat terminal device 40 side flowchart, respectively.

As illustrated in FIGS. 9A and 9B, in the server 30, the video data acquisition unit 31 acquires a plurality of pieces of video data input through a plurality of cameras 10 and stores the pieces of video data in the storage unit 38 (Step S10). Further, the score data acquisition unit 32 acquires score data input through the score input unit 20 and stores the score data in the storage unit 38 (Step S20). The chat data processor 33 generates chat data having a content corresponding to the score data each time the score data is input and stores the chat data in the storage unit 38 (Step S30). The input information acquisition unit 36 acquires a detection result of the biological information sensor 15 and stores the detection result in the storage unit 38 in association with the chat data (Step S40). The excitement information generation unit 37 generates excitement information based on the acquired biological information (Step S50). The server communication unit 35 transmits the video data, chat data, and excitement information stored in the storage unit 38 (Step S060). In Step S60, the biological information may be transmitted together.

In the chat terminal device 40, the communication unit 43 receives the video data, chat data, and excitement information transmitted from the server 30 (Step S70). The storage control unit 62 stores the received video data, chat data, and excitement information in the storage unit 44. The display control unit 63 displays, on the display 42, the video data, chat data, and excitement information stored in the storage unit 44 (Step S80).

As described above, the chat system 100 according to the present embodiment includes: the score data acquisition unit 32 that acquires game situation data indicating a situation of a game; the input information acquisition unit 36 that acquires biological information of at least one person among participants of the game and spectators of the game; the chat data processor 33 that generates, in response to acquiring the game situation data, situation chat data which is chat data having a content corresponding to the game situation data; the storage unit 38 that stores the situation chat data generated by the chat data processor 33 in association with a time; the excitement information generation unit 37 that generates, in response to storing the situation chat data in the storage unit 38, excitement information that indicates a degree of excitement in the game based on the biological information acquired at a time corresponding to a time at which the situation chat data is stored in the storage unit 38, and stores, in the storage unit 38, the excitement information in association with the situation chat data; and the server communication unit 35 that can transmit, to the chat terminal device, the situation chat data stored in the storage unit 38 and the excitement information corresponding to the situation chat data.

Further, the chat system 100 according to the present embodiment includes the server 30 and the chat terminal devices 40 and 40A each including the communication unit 43 that acquires chat data and excitement information from the server 30, and the control unit 45 that causes the display 42 to display the acquired chat data and excitement information in an associated manner.

In addition, the chat display method according to the present embodiment includes: acquiring, by the server 30, game situation data that indicates a situation of a game; acquiring, by the server 30, input information individually input for at least one subject among participants of the game and spectators of the game; generating, by the server 30, in response to acquiring the game situation data, situation chat data which is chat data having a content corresponding to the game situation data; storing, by the server 30, in the storage unit 38, the generated situation chat data in association with a time; generating, by the server 30, in response to storing the situation chat data in the storage unit 38, excitement information that indicates a degree of excitement in the game based on the input information acquired at a time corresponding to a time at which the situation chat data is stored in the storage unit 38, and storing, in the storage unit 38, the excitement information in association with the situation chat data; and transmitting, by the server 30, to each of the chat terminal devices 40 and 40A, the situation chat data stored in the storage unit 38 and the excitement information corresponding to the situation chat data, and causes each of the chat terminal devices 40 and 40A to perform: acquiring, by the server 30, chat data and excitement information from the server 30; and causing, by the server 30, a display to display the acquired chat data and excitement information in an associated manner.

In addition, the chat data processing program according to the present embodiment causes the server 30 to perform: acquiring game situation data that indicates a situation of a game; acquiring input information individually input for at least one subject among participants of the game and spectators of the game; generating, in response to acquiring the game situation data, situation chat data which is chat data having a content corresponding to the game situation data;

storing, in the storage unit 38, the generated situation chat data in association with a time; generating, in response to storing the situation chat data in the storage unit 38, excitement information that indicates a degree of excitement in the game based on the input information acquired at a time corresponding to a time at which the situation chat data is stored in the storage unit 38, and storing, in the storage unit 38, the excitement information in association with the situation chat data; and transmitting, to each of the chat terminal devices 40 and 40A, the situation chat data stored in the storage unit 38 and the excitement information corresponding to the situation chat data. The chat data processing program according to the present embodiment further causes each of the chat terminal devices 40 and 40A to perform: acquiring the chat data and the excitement information from the server 30; and causing a display to display the acquired chat data and excitement information in an associated manner.

According to the above-described configuration, the excitement information is generated based on the input information individually input for at least one subject among participants of a game and spectators of the game, and the generated excitement information is transmitted to each of the chat terminal devices 40 and 40A. Therefore, in the chat terminal devices 40 and 40A, the received excitement information is displayed on the display 42 in association with chat data. As a result, the user can efficiently grasp an exciting scene of the game. Further, since the excitement information is generated based on the biological information, the user can grasp the exciting scene in real time. In addition, since the excitement information is generated based on the input information individually input for at least one subject among the participants of the game and the spectators of the game, it is possible to generate the excitement information with higher accuracy, as compared to voice information such as voice of the entire spectators in a game site.

In the chat system 100 according to the present embodiment, the input information includes the biological information of the subject. As a result, even when watching a game in a quiet environment, the excitement information can be generated based on the biological information, for example, detecting an increase in heart rate or detecting an increase in respiration rate in a tense scene. Therefore, the user can efficiently grasp the exciting scene of the game.

In the chat system 100 according to the present embodiment, the control unit 45 of each of the chat terminal devices 40 and 40A displays the situation chat data on the display 42 in a display form corresponding to the excitement information. As a result, a user who browses the chat data can efficiently grasp the exciting scene of the game.

In the chat system 100 according to the present embodiment, the control unit of each of the chat terminal devices 40 and 40A displays the excitement information so as to correspond to the display position of the situation chat data. As a result, a user who browses the chat display region 42b can efficiently grasp the exciting scene of the game without reading the content of the chat data.

Second Embodiment

Figure 10:
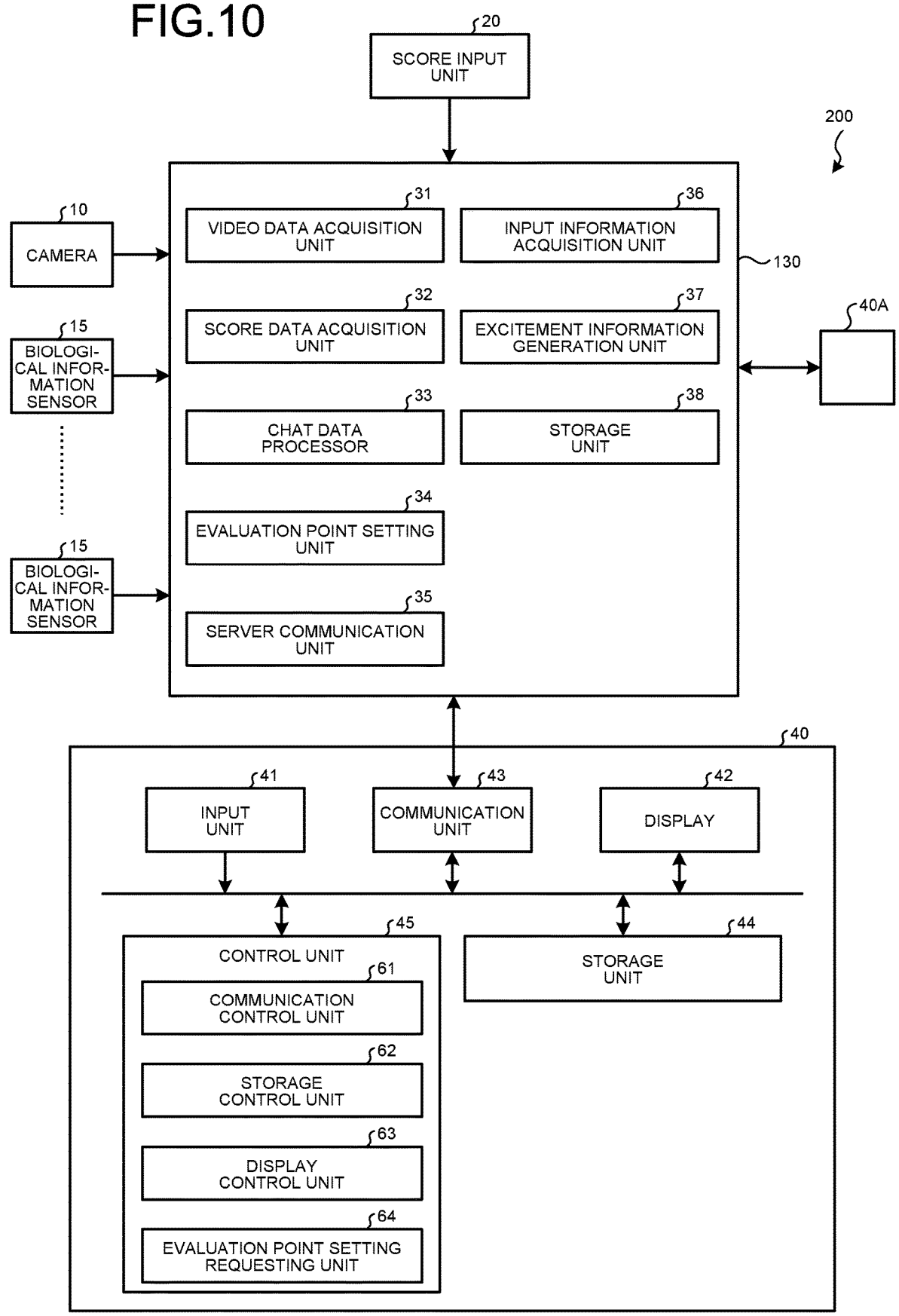
FIG. 10 is a schematic diagram illustrating an example of a chat system according to a second embodiment.

Next, a second embodiment will be described. FIG. 10 is a schematic diagram illustrating an example of a chat system 200 according to the second embodiment. As illustrated in FIG. 10, the chat system 200 includes a server 130 and chat terminal devices 40 and 40A. Configurations of the chat terminal devices 40 and 40A are the same as those in the above-described embodiment. In the present embodiment, the server 130 includes an evaluation point setting unit 34 in addition to the components of the first embodiment. Other components of the server 130 are the same as those of the first embodiment.

The evaluation point setting unit 34 sets, in response to a request (hereinafter, referred to as evaluation point setting request) for setting of an evaluation point for chat data stored in a storage unit 38 from the chat terminal device 40 or 40A, the evaluation point for the chat data based on the evaluation point setting request. The evaluation point setting unit 34 can set an evaluation point for each chat data based on the evaluation point setting request from the chat terminal device 40 or 40A. The evaluation point setting request includes target chat data and information on an evaluation point for the chat data. When receiving a plurality of evaluation point setting requests for one piece of chat data, the evaluation point setting unit 34 can set a total of evaluation points based on the plurality of evaluation point setting requests as an evaluation point for the one piece of chat data.

A server communication unit 35 can transmit, for example, an evaluation point set for chat data to each of the chat terminal devices 40 and 40A, in addition to video data and the chat data stored in a storage unit 38. Further, the server communication unit 35 can receive an evaluation point setting request from each of the chat terminal devices 40 and 40A.

The storage unit 38 stores a plurality of pieces of video data acquired by a video data acquisition unit 31, score data acquired by a score data acquisition unit 32, chat data processed by a chat data processor 33, and an evaluation point set by the evaluation point setting unit 34. The storage unit 38 can store chat data and an evaluation point corresponding to the chat data in association with each other.

Further, the storage unit 38 stores therein a chat data processing program. The chat data processing program causes the server 130 to perform: transmitting and receiving chat data to and from a plurality of chat terminal devices 40 and 40A; storing, in the storage unit 38, the chat data received through the server communication unit 35; setting, in response to an evaluation point setting request for setting of an evaluation point for the chat data stored in the storage unit 38 from each of the chat terminal devices 40 and 40A, the evaluation point for the chat data based on the evaluation point setting request; storing, in the storage unit 38, the chat data and evaluation point data indicating the evaluation point in association with each other in response to setting the evaluation point for the chat data stored in the storage unit 38; and transmitting, to each of the chat terminal devices 40 and 40A, the chat data stored in the storage unit 38, and transmitting, in response to setting the evaluation point data for the chat data based on the request, the chat data and the evaluation point data corresponding to the chat data to each of the chat terminal devices 40 and 40A. The chat data processing program further causes each of the chat terminal devices 40 and 40A to perform: transmitting the request for setting of the evaluation point for the chat data stored in the storage unit 38; acquiring the chat data and the evaluation point data from the server 130; and causing a display 42 to display the acquired chat data and evaluation point data in an associated manner.

The chat terminal devices 40 and 40A each include a communication control unit 61, a storage control unit 62, a display control unit 63, and an evaluation point setting requesting unit 64.

The communication control unit 61 transmits an evaluation point setting request to the server 130 via the communication unit 43.

Figure 11:
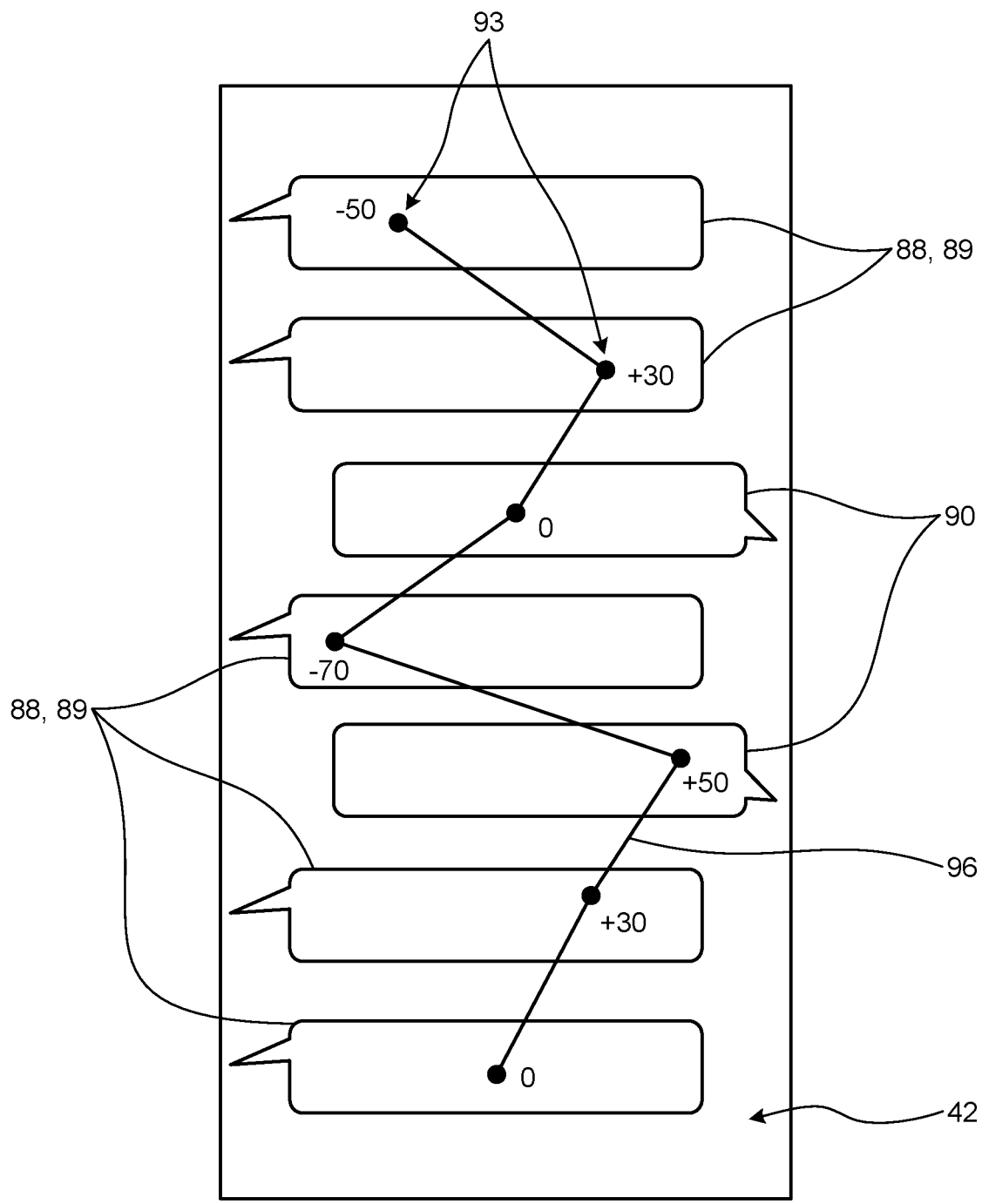
FIG. 11 is a diagram illustrating an example of a display content displayed on a display.

The display control unit 63 controls a display content to be displayed on the display 42. FIG. 11 is a diagram illustrating an example of the display content displayed on the display 42. In the example illustrated in FIG. 11, a video display region is omitted and only a chat display region is illustrated. As illustrated in FIG. 11, the display control unit 63 can display a plurality of pieces of chat data (a server message 88, other's message 89, and a user's message 90) on the display 42, similarly to the first embodiment. The display control unit 63 can display indexes 93 and a line graph 96 that indicate evaluation points of the respective pieces of chat data on the display 42.

The index 93 indicates an evaluation point in a form of a coordinate position, in which the right side of the display 42 in a left-right direction is "+" and the left side is "−". The index 93 is displayed for each chat data. Each index 93 is arranged at the center of a speech balloon in a top-bottom direction, the speech balloon indicating a range of each chat data. In this way, the display control unit 63 displays chat data and an index 93 for the chat data in association with each other. The line graph 96 is a graph in which the indexes 93 are connected by a straight line.

Figure 12:
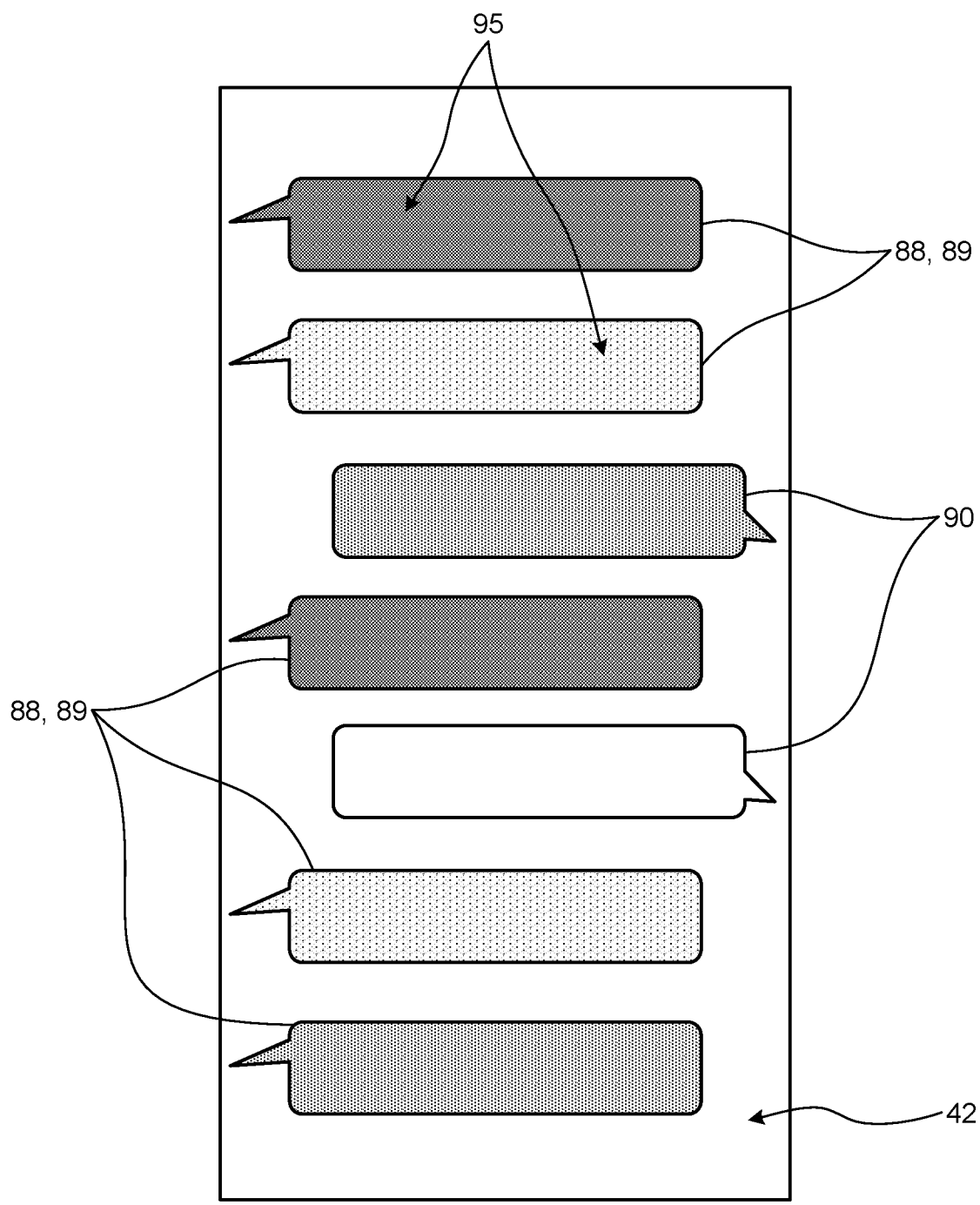
FIG. 12 is a diagram illustrating another example of the display content displayed on the display.

FIG. 12 is a diagram illustrating another example of the display content displayed on the display 42. As illustrated in FIG. 12, the display control unit 63 can display a speech balloon so that a depth of a background color of the speech balloon changes depending on an evaluation point for chat data. For example, the display control unit 63 can lighten a background color of a speech balloon for chat data with a high evaluation point and deepen a background color of a speech balloon for chat data with a low evaluation point. In this case, the deeper the background color, the harder it becomes to see a content of the chat, and the lighter the background color, the easier it becomes to see a content of the chat.

The evaluation point setting requesting unit 64 generates an evaluation point setting request. The evaluation point setting requesting unit 64 can set target chat data and an evaluation point to be requested, by performing a predetermined operation, for example, in a state in which pieces of chat data are displayed on the display 42. Examples of the predetermined operation include a so-called flick operation which is an operation of moving a touch point from inside to outside of the target chat data.

In this case, the evaluation point setting requesting unit 64 can set the evaluation point based on a direction in which the touch point is moved. For example, the evaluation point setting requesting unit 64 can set the evaluation point to +1 when moving the touch point upward. Further, the evaluation point setting requesting unit 64 can set the evaluation point to −1 when moving the touch point downward. In addition, the evaluation point setting requesting unit 64 can set the evaluation point to 0 when moving the touch point in the left-right direction.

In addition, the evaluation point setting requesting unit 64 can set the evaluation point based on a speed at which the touch point is moved. For example, the evaluation point setting requesting unit 64 can set an evaluation point with a higher absolute value in a case where the moving speed of the touch point in each direction described above is higher than a first threshold value, and can set an evaluation point with a higher absolute value in a case where the moving speed of the touch point TP is lower than a second threshold value. Specifically, in a case where the touch point is moved upward at a speed higher than the first threshold value, the evaluation point setting requesting unit 64 can set the evaluation point with a higher absolute value, for example, +2. Further, in a case where the touch point is moved downward at a speed higher than the first threshold value, the evaluation point setting requesting unit 64 can set the evaluation point with a higher absolute value, for example, −2.

Figure 13A:
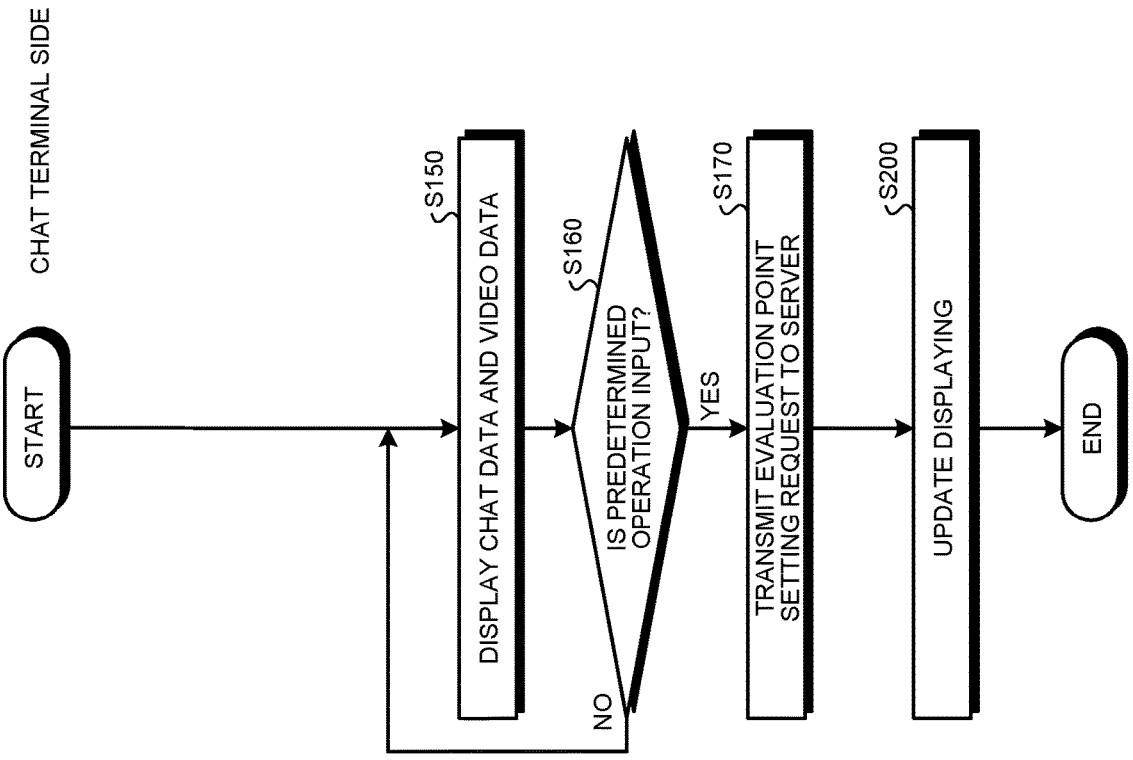
FIGS. 13A and 13B are flowcharts illustrating an example of a chat display method according to the second embodiment.
Figure 13B:
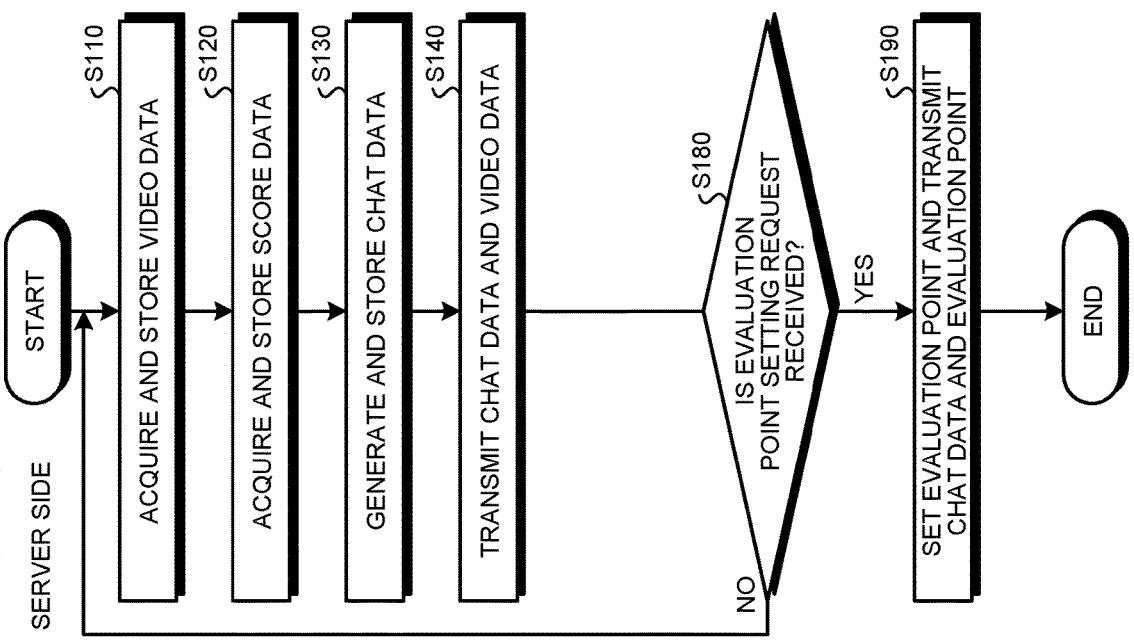

Next, an operation of the chat system 200 configured as described above will be described. FIGS. 13A and 13B are flowcharts illustrating an example of a chat display method according to the second embodiment. As illustrated in FIGS. 13A and 13B, in the server 130, the video data acquisition unit 31 acquires a plurality of pieces of video data input through a plurality of cameras 10 and stores the video data in the storage unit 38 (Step S110). Further, the score data acquisition unit 32 acquires score data input through the score input unit 20 and stores the score data in the storage unit 38 (Step S120). The chat data processor 33 generates chat data having a content corresponding to the score data each time the score data is input and stores the chat data in the storage unit 38 (Step S130). The server communication unit 35 transmits the chat data and the video data stored in the storage unit 38 to the chat terminal device 40 (Step S140).

In the chat terminal device 40, the chat data and the video data transmitted from the server 130 are received and displayed on the display 42 (Step S150). The display control unit 63 determines whether a predetermined operation for making an evaluation point setting request is performed on the chat data (Step S160). In a case where it is determined that the predetermined operation is not performed (No in Step S160), the processing from Step S150 is repeatedly performed. In a case where it is determined that the predetermined operation is performed (Yes in Step S160), the evaluation point setting requesting unit 64 sets target chat data and an evaluation point to be requested according to the predetermined operation, and transmits the evaluation point setting request to the server 130 (Step S170).

In the server 130, whether the evaluation point setting request is received is determined (Step S180). In a case where it is determined that the evaluation point setting request is not received (No in Step S180), the processing from Step S110 is repeatedly performed. In a case where it is determined that the evaluation point setting request is received (Yes in Step S180), the evaluation point setting unit 34 sets evaluation point data for the chat data based on the request and stores the evaluation point data in the storage unit 38, and transmits the stored chat data and the evaluation point data to each of the chat terminal devices 40 and 40A via the server communication unit 35 (Step S190).

In the chat terminal device 40, displaying on the display 42 is updated with the chat data and the evaluation point data transmitted from the server 130 (Step S200). With Step S200, the displaying on the display 42 is performed while reflecting the evaluation point.

As described above, the chat system 200 according to the present embodiment includes the server 130 and the chat terminal devices 40 and 40A. The server 130 includes the server communication unit 35 that can transmit and receive chat data to and from a plurality of chat terminal devices 40 and 40A, the storage unit 38 that stores the chat data received through the server communication unit 35; the evaluation point setting unit 34 that sets, in response to a request for setting of an evaluation point for the chat data stored in the storage unit 38 from each of the chat terminal devices 40 and 40A, the evaluation point for the chat data based on the request; and the chat data processor 33 that stores, in the storage unit 38, the chat data and evaluation point data indicating the evaluation point in association with each other in response to setting the evaluation point for the chat data stored in the storage unit 38, and transmits, to each of the chat terminal devices 40 and 40A, the chat data and the evaluation point data corresponding to the chat data. The chat terminal devices 40 and 40A each includes the evaluation point setting requesting unit 64 that transmits the request for setting of the evaluation point for the chat data stored in the storage unit 38; the communication unit 43 that acquires the chat data and the evaluation point data from the server 130; and the display control unit 63 that causes the display 42 to display the acquired chat data and evaluation point data in an associated manner.

The chat display method according to the present embodiment includes: transmitting and receiving, by the server 130, chat data to and from a plurality of chat terminal devices 40 and 40A; storing, by the server 130, in the storage unit 38, the chat data received through the server communication unit 35; setting, by the server 130, in response to a request for setting of an evaluation point for the chat data stored in the storage unit 38 from each of the chat terminal devices 40 and 40A, the evaluation point for the chat data based on the request; storing, by the server 130, in the storage unit 38, the chat data and evaluation point data indicating the evaluation point in association with each other in response to setting the evaluation point for the chat data stored in the storage unit 38; transmitting, by the server 130, to each of the chat terminal devices 40 and 40A, the chat data stored in the storage unit 38, and transmitting, in response to setting the evaluation point data for the chat data based on the request, the chat data and the evaluation point data corresponding to the chat data to each of the chat terminal devices 40 and 40A; transmitting, by the chat terminal devices 40 and 40A, the request for setting of the evaluation point for the chat data stored in the storage unit 38; acquiring, by the chat terminal devices 40 and 40A, the chat data and the evaluation point data from the server 130; and causing, by the chat terminal devices 40 and 40A, the display 42 to display the acquired chat data and evaluation point data in an associated manner.

The chat data processing program according to the present embodiment causes the server 130 to perform: transmitting and receiving chat data to and from a plurality of chat terminal devices 40 and 40A; storing, in the storage unit 38, the chat data received through the server communication unit 35; setting, in response to a request for setting of an evaluation point for the chat data stored in the storage unit 38 from each of the chat terminal devices 40 and 40A, the evaluation point for the chat data based on the request; storing, in the storage unit 38, the chat data and evaluation point data indicating the evaluation point in association with each other in response to setting the evaluation point for the chat data stored in the storage unit 38; and transmitting, to each of the chat terminal devices 40 and 40A, the chat data stored in the storage unit 38, and transmitting, in response to setting the evaluation point data for the chat data in response to the request, the chat data and the evaluation point data corresponding to the chat data to each of the chat terminal devices 40 and 40A. The chat data processing program causes each of the chat terminal devices 40 and 40A to perform: transmitting the request for setting of the evaluation point for the chat data stored in the storage unit 38; acquiring the chat data and the evaluation point data from the server 130; and causing the display 42 to display the acquired chat data and evaluation point data in an associated manner.

According to the above-described configuration, when a plurality of pieces of chat data are displayed on each of the chat terminal devices 40 and 40A, the pieces of chat data and evaluation points can be displayed in association with each other. As a result, the user can easily know the evaluation point for each chat data.

In the chat system 200 according to the present embodiment, the control unit 45 of each of the chat terminal devices 40 and 40A displays the chat data on the display 42 in a display form corresponding to the evaluation point. As a result, the user can easily identify chat data with a high evaluation point.

In the chat system 200 according to the present embodiment, the control unit 45 of each of the chat terminal devices 40 and 40A displays a graph indicating an evaluation point so as to correspond to a display position of chat data. As a result, the user can easily identify chat data with a high evaluation point and chat data with a low evaluation point.

The technical scope of the present invention is not limited to the above-described embodiment, and appropriate modifications can be made without departing from the spirit of the present invention. For example, in the chat system 200 according to the second embodiment, the server 130 need not necessarily include an input information acquisition unit 36 and an excitement information generation unit 37. Further, in a case where the server 130 includes the input information acquisition unit 36 and the excitement information generation unit 37, the excitement information generation unit 37 may generate excitement information based on an evaluation point, in addition to or instead of biological information.

Third Embodiment

Figure 14:
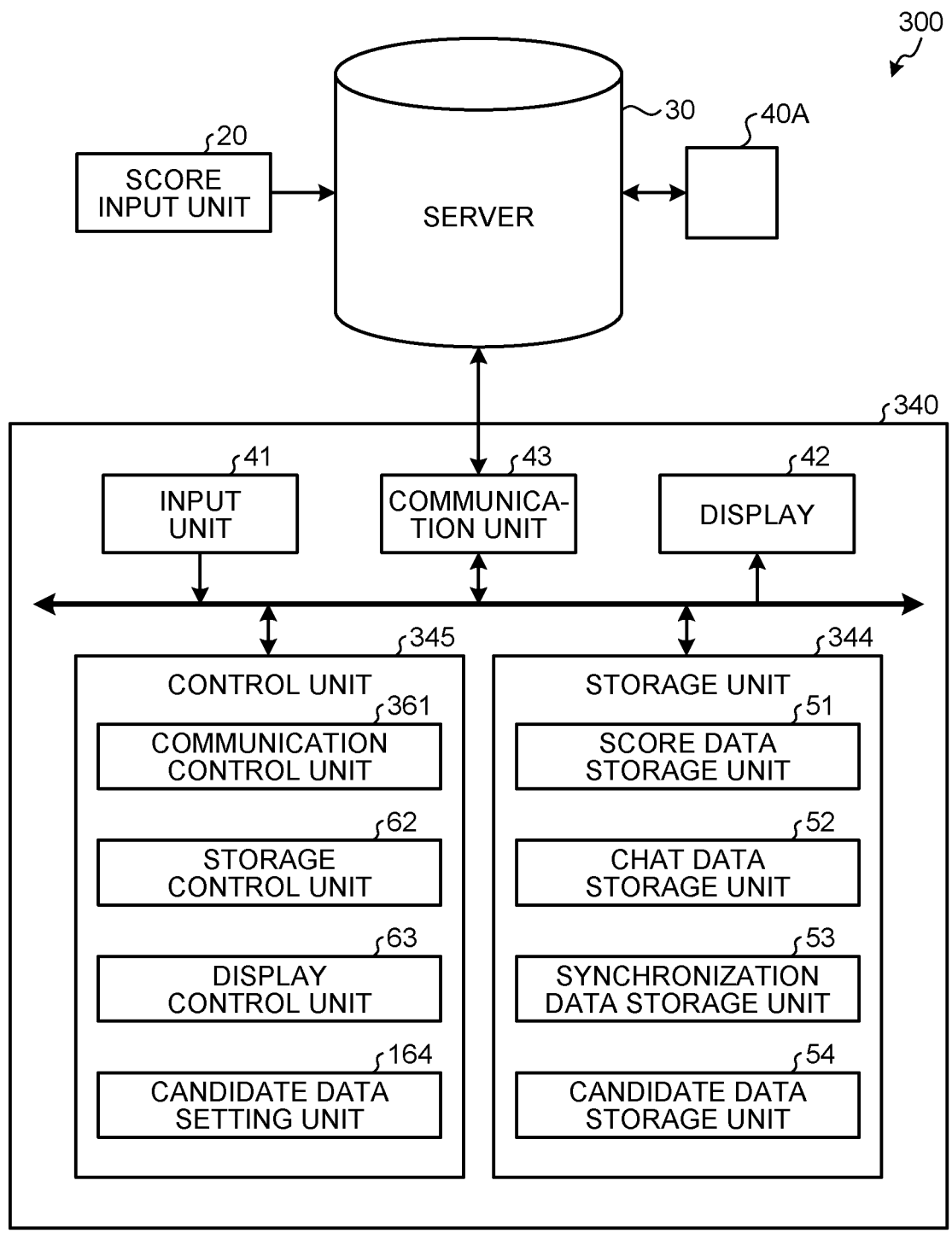
FIG. 14 is a block diagram illustrating an example of a chat system according to a third embodiment.

FIG. 14 is a block diagram illustrating an example of a chat system 300 according to a third embodiment. The chat system 300 illustrated in FIG. 14 is used when chatting about a content of a game in a sports competition such as a baseball game, for example. By using the chat system 300, it is possible to report a game situation and the like by using a chat so that even a person who cannot participate in the game or directly watch the game can grasp the game situation. In the following, a baseball game will be described as an example of the sports competition, but the present invention is not limited thereto and the same description can be applied to other sports competitions such as a soccer game, a volleyball game, a tennis game, and a badminton game. Further, the chat system 300 is also adaptable to competitions such as a dance contest (dancing competition), a piano contest (performance competition), a karuta competition (card game competition or table game competition), a karaoke contest (singing competition), and a game contest, other than the sports competitions.

As illustrated in FIG. 14, the chat system 300 includes a score input unit 20, a server 30, and chat terminal devices 340 and 40A. Note that the chat system 300 may include a camera (not illustrated). In this case, the camera captures a content of the game in a game site, for example. Video data captured by the camera is transmitted to, for example, the server 30 and managed by the server 30. The number of cameras is plural, for example. Further, the camera may be any camera as long as it can capture video data. The camera may be, for example, a camera embedded in a mobile phone, a smartphone, or the like. When the camera captures video data, the camera includes data indicating a capturing time in the video data.

The score input unit 20 inputs game situation data indicating a situation of the game to the server 30. In the present embodiment, examples of game situation data indicating a situation of a baseball game can include score data. The score data is data that constitutes a score described in a baseball score book, and is an individual event that constitutes a series of events starting from a pitch of a pitcher. The score is a set of score data. Therefore, each time the pitcher throws one ball, a plurality of pieces of score data are created, such that one score is created. For example, in a case where a result of batting in a state in which a runner is on first base is a fly out to right and the first base runner is also tagged out, score data indicating that the batter is out, score data indicating a fly to right, and score data indicating that the first base runner is out are created, and one score is constituted by these pieces of score data.

In addition to the score data described above, score data such as an action of the batter, an action of a fielder, determination of a count, a state of an advancement of a runner when there is already a runner on base, and other play of batters or fielders can be included in the score. Specifically, the score can include score data such as a strike, a ball, a foul, a batting result, a type of batted ball, a catching fielder, or an advancement result. The batting result is information such as out, a single, a double, a triple, or a home run. The type of batted ball is information such as a ground ball, a line drive, a fly ball, or a bunt, and may be categorized into more types. The catching fielder is information for specifying a fielder who actually caught the batted ball or a defensive position of the fielder. The advancement result is information regarding an advancement of a runner on base, such as "from first base to second base", and can include other play of batters and fielders.

Examples of the score input unit 20 can include an application for inputting the above score data into the server 30 as electronic data. In this case, the score input unit 20 may be provided in a processing device such as a personal computer installed outside the server 30. Alternatively, the score input unit 20 may be provided in the server 30. Note that, in the present embodiment, the score input unit 20 need not necessarily be provided.

The server 30 comprehensively manages the chat system 300. The server 30 includes various applications, data, programs, and the like for managing the chat system 300. As the server 30, for example, a personal computer, a workstation or the like is used, but the present invention is not limited thereto.

A plurality of chat groups are set in the server 30. Each of the chat groups is individually set for each competition, each game, or each team, for example. The server 30 performs various processing to be described below for each chat group.

Chat data indicating a content of a chat corresponding to a game is input to the server 30. The server 30 stores the input chat data. As the server 30 stores the chat data, the chat data can be received from the server 30. When the chat data is stored, the server 30 includes, in the chat data, data indicating a time (hereinafter, referred to as upload time) when the chat data is stored. That is, the chat data stored in the server 30 includes the data indicating the upload time. The server 30 includes a management application that manages the video data and the chat data.

Further, score data may be input from the score input unit 20 to the server 30. In this case, the server 30 may generate chat data based on the input score data and store the chat data. For example, the server 30 can generate chat data that expresses a content of the score data with characters each time new score data is input. Accordingly, when the score data is updated, the updated score data can be checked as chat information. Further, video data captured by the camera may be input to the server 30.

The chat terminal devices 340 and 40A each include an input unit 41, a display 42, a communication unit 43, a storage unit 344, and a control unit 345. The input unit 41, the display 42, the communication unit 43, the storage unit 344, and the control unit 345 are connected via, for example, a bus line. Examples of the chat terminal device 340 include a mobile information terminal such as a mobile phone, a smartphone, a tablet PC, or a laptop personal computer.

Through the input unit 41, a predetermined input operation for inputting information such as chat data can be performed. The input unit 41 outputs an instruction signal for the control unit 345 according to an input operation. An input device such as a touch panel is used as the input unit 41. Note that, as the input unit 41, a button, a lever, a dial, a switch, or another input device may be used, in addition to or instead of the touch panel. The input unit 41 outputs an instruction signal according to a predetermined input operation. The display 42 displays various information including a character and an image. The display 42 includes a display panel such as a liquid crystal panel.

Figure 15:
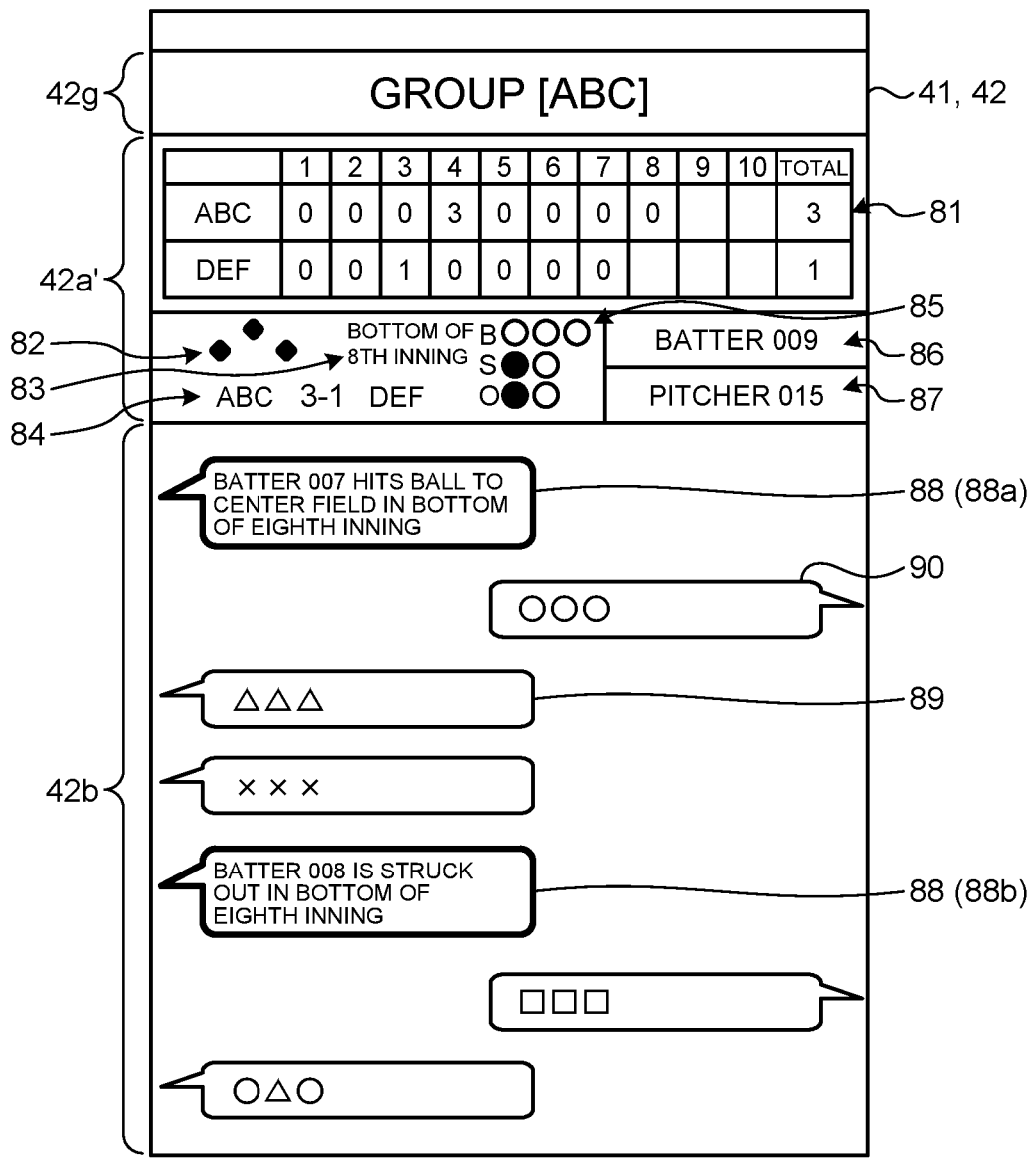
FIG. 15 is a diagram illustrating an example of an input unit and a display of a chat terminal device according to the third embodiment.

FIG. 15 is a diagram illustrating an example of the input unit 41 and the display 42 of the chat terminal device 340 according to the present embodiment. As illustrated in FIG. 15, the chat terminal device 340 includes the touch panel type input unit 41 and the display 42. That is, a touch panel as the input unit 41 is arranged so as to overlap with a display panel as the display 42.

The display 42 displays, for example, a score display region 42*a*', a chat display region 42*b*, and a group display region 42*g*. Score data is displayed in the score display region 42*a*'. For example, in the score display region 42*a*', a scoreboard 81 for displaying a score for each inning, an advancement display 82 for displaying an advancement situation of a runner, an inning display 83 for displaying an inning, a score display 84 for displaying a total score of each team, a count display 85 for displaying the count of balls and the count of outs, a batter display 86 for displaying a batter, and a pitcher display 87 for displaying a pitcher are displayed. Note that the displaying in the score display region 42*a*' is not limited thereto, and some displays may be omitted, for example.

Chat data is displayed in the chat display region 42*b*. For example, in the chat display region 42*b*, a server message 88 which is chat data generated by the server 30, other's message 89 which is chat data input through another chat terminal device 40A different from the chat terminal device 340, a user's message 90 which is chat data input through the chat terminal device 340, or the like is displayed. The server message 88 indicates a content of score data input to the server 30, for example, in a form of characters. A server message 88*a* on the upper side of FIG. 15 has a content indicating that, for example, the batter 007 hits a ball to center field in the bottom of the eighth inning. Further, a server message 88*b* on the lower side of FIG. 15 has a content indicating that the batter 008 is struck out in the bottom of the eighth inning.

Note that the server message 88 and the other's message 89 are displayed in an area on the left side of the chat display region 42*b*, for example. Further, the user's message 90 is displayed in an area on the right side of the chat display region 42b, for example. Further, the server message 88 and the other's message 89 may be displayed in a distinguishable form. For example, the type of a frame in which each message is displayed may be different for each message. As a result, the server message 88 and the other's message 89 can be distinguished. Information on a group to which an operator of the chat terminal device 340 belongs is displayed in the group display region 42g. Note that the user's message 90 may be a message composed of text data.

In a case where a touch operation, a scroll operation, or the like is performed on a predetermined region in a surface of the touch panel, the input unit 41 outputs a predetermined instruction signal including position information of the region on which the operation is performed, and an operation content. The position information is set so as to correspond to a position on the display 42, for example. Note that the configurations of the input unit 41 and the display 42 are not limited to the above-described configurations.

The communication unit 43 communicates information with an external device is a wired or wireless manner. The communication unit 43 transmits/receives video data, chat data, score data, and the like to/from the external server 30, for example.

The storage unit 344 includes a storage such as a hard disk drive or a solid state drive. Note that an external storage medium such as a removable disk may be used as the storage unit 344. The storage unit 344 stores an operating system of the chat terminal device 340, various programs for controlling operations of the input unit 41, the display 42, and the communication unit 43, a chat application for chatting, various programs, data, and the like. For example, the storage unit 344 may store frame data such as the score display region 42a', the chat display region 42b, or the group display region 42g to be displayed on the display 42.

In addition, the storage unit 344 stores a chat input program that causes a computer to perform: receiving game situation data indicating a situation of a game and chat data indicating a content of a chat corresponding to the game from the server that manages the game situation data and the chat data; storing the received game situation data and chat data in association with a time; displaying, for inputting of the chat data, pieces of chat data each having a content corresponding to the game situation data at an input point in time, as pieces of candidate data on the display; and transmitting, in a case where one of the pieces of candidate data displayed on the display is selected, the selected candidate data as the chat data to the server.

The storage unit 344 includes a score data storage unit 51, a chat data storage unit 52, a synchronization data storage unit 53, and a candidate data storage unit 54.

The score data storage unit 51 stores the score data received through the communication unit 43. Examples of the score data stored in the score data storage unit 51 include information such as batter score data, runner score data, and tag information. Note that the score data may include other information such as a fielder's action.

The chat data storage unit 52 stores the chat data received through the communication unit 43. FIG. 16 is a diagram illustrating an example of the chat data stored in the chat data storage unit 52. As illustrated in FIG. 16, the chat data includes an input ID 75, an inputter ID 76, an input content 77, and tag information 78.

One input ID 75 is created each time the chat data is input to or generated in the server 30. The inputter ID 76 is information for identifying an inputter of one piece of chat data. For example, in a case of the chat data generated by the server 30, the inputter ID 76 may be a predetermined value (for example, "999" or the like). The input content 77 is information indicating a content of a message displayed in the chat display region 42b. The input content 77 includes, for example, character data or predetermined illustration data. The tag information 78 is information for identifying chat data created for each input ID 75. One piece of tag information 78 is created each time the input ID 75 is created. Tag numbers (TC0054, TC0055, . . . ) are given to the tag information 78 in ascending order as indexes. Note that an ID number of the input ID 75 may be used as the tag information.

The synchronization data storage unit 53 stores synchronization data that associates score data with chat data. FIG. 17 is a diagram illustrating an example of the synchronization data stored in the synchronization data storage unit 53. As illustrated in FIG. 17, the synchronization data includes tag information 79 and upload time information 180. The tag information 79 is information corresponding to the tag information 78 of the chat data described above. The tag information 79 is arranged in the order according to the upload time information 180. For example, the same tag number (TC0054, TC0055, . . . ) as the corresponding tag information 78 is given to the tag information 79, but the present invention is not limited thereto. For example, a series of tag numbers independent of the tag information 78 may be added to the tag information 79. The upload time information 180 indicates a time when the score data and the chat data associated with the tag information 79 are uploaded to the server 30. With the tag information 79 and the upload time information 180, the score data and the chat data are stored in association with each other based on the upload time.

The candidate data storage unit 54 stores a plurality of pieces of candidate data. The candidate data is chat data having a content corresponding to game situation data for inputting of the chat data through the input unit 41. FIG. 18 is a diagram illustrating an example of the pieces of candidate data stored in the candidate data storage unit 54. As illustrated in FIG. 18, examples of the pieces of candidate data include phrases for expressing pleasure, celebration, and the like when the score is favorable, such as "yeah!", "congratulations", and "that's great", and phrases for expressing disappointment and the like when the score is unfavorable, such as "it's unfortunate" and "it's screwed up". In the candidate data, a priority is set for each of a case where the score is favorable and a case where the score is unfavorable. The pieces of candidate data are displayed in descending order of priority when inputting chat data.

The control unit 345 controls each of the input unit 41, the display 42, the communication unit 43, and the storage unit 344. Further, the control unit 345 performs arithmetic operation, processing, and the like according to the instruction signal from the input unit 41. The control unit 345 includes a processing device such as a central processing unit (CPU), and a storage device such as a random access memory (RAM) and a read only memory (ROM). The control unit 345 includes a communication control unit 61, a storage control unit 62, a display control unit 63, and a candidate data setting unit 164.

The communication control unit 61 accesses the server 30 via the communication unit 43 to receive score data, chat data, and the like stored in the server 30. In addition, the communication control unit 61 transmits chat data input or selected by the input unit 41 to the server 30 via the communication unit 43.

The storage control unit 62 stores, in the storage unit 344, the score data, the chat data, and the like acquired from the server 30 in association with the upload time.

The display control unit 63 controls a display content to be displayed on the display 42. The display control unit 63 controls a display content in the score display region 42a' based on the score data acquired via the communication unit 43.

Further, the display control unit 63 controls a display content in the chat display region 42b based on the chat data acquired via the communication unit 43. When displaying the chat data in the chat display region 42b, the display control unit 63 displays a displayable number of pieces of chat data in the chat display region 42b side by side in one direction in time series based on the upload time. In the present embodiment, for example, as illustrated in FIG. 15, the pieces of chat data are displayed side by side in time series from the upper side to the lower side of the chat display region 42b in the drawing.

In addition, in a case where new chat data is stored in the server 30, the display control unit 63 acquires the latest chat data stored in the server 30 via the communication unit 43, and updates the display content in the chat display region 42b. In this case, the display control unit 63 determines whether a space for displaying new chat data exits below chat data displayed most recently in time series in the chat display region 42b. In a case where the space for displaying new chat data exits, the display control unit 63 displays new chat data in the space. Further, in a case where no space for displaying new chat data exists, the display control unit 63 scrolls the entire chat display region 42b in a direction to push, toward the upper side of the chat display region 42b, the oldest chat data displayed in the chat display region 42b in time series, that is the uppermost chat data displayed in the chat display region 42b. Then, the display control unit 63 displays new chat data in a space on the lower side of the chat display region 42b that is vacated by scrolling. As a result, the display control unit 63 can update the chat data displayed in the chat display region 42b in real time each time new chat data is uploaded to the server 30 and stored in the storage unit 344.

Further, the display control unit 63 can control the display content in the chat display region 42b based on past chat data stored in the storage unit 344. For example, when the operator slides a touch position upward or downward in a state of touching the chat display region 42b of the input unit (touch panel) 41, that is, when the operator performs an operation of manually scrolling the chat display region 42b, the display control unit 63 changes the chat data displayed in the chat display region 42b according to a scroll direction and a scroll amount. For example, when the operator slides the touch position upward, chat data uploaded later than the chat data that is currently displayed is displayed in the chat display region 42b. Further, when the operator slides the touch position downward, chat data uploaded earlier than the chat data that is currently displayed is displayed in the chat display region 42b. Note that a method of changing the chat data displayed in the chat display region 42b is not limited thereto, and another method such as a button, a keyboard, or a mouse may be used.

Figure 19:
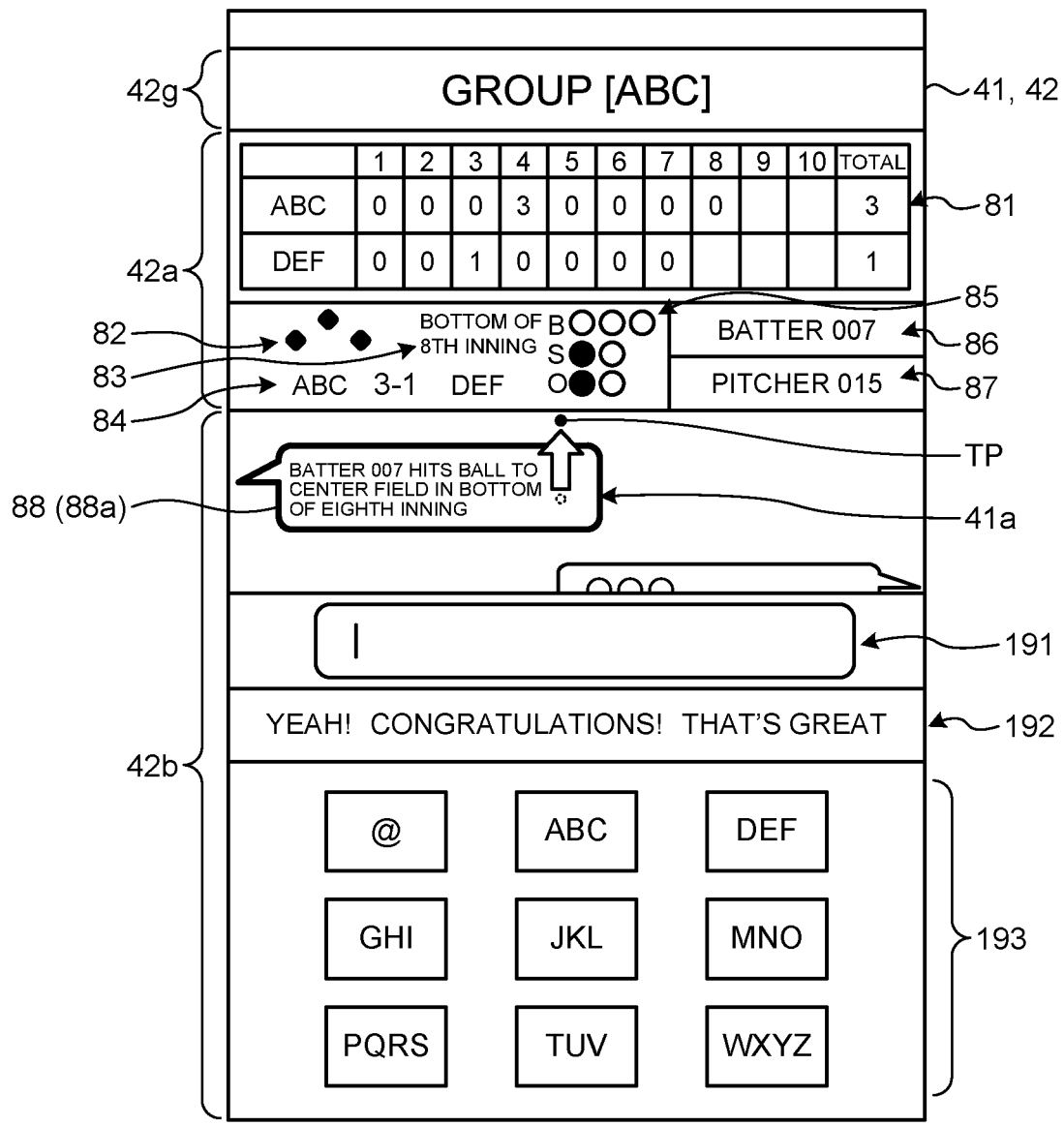
FIG. 19 is a diagram illustrating an example of an input screen for inputting chat data.
Figure 20:
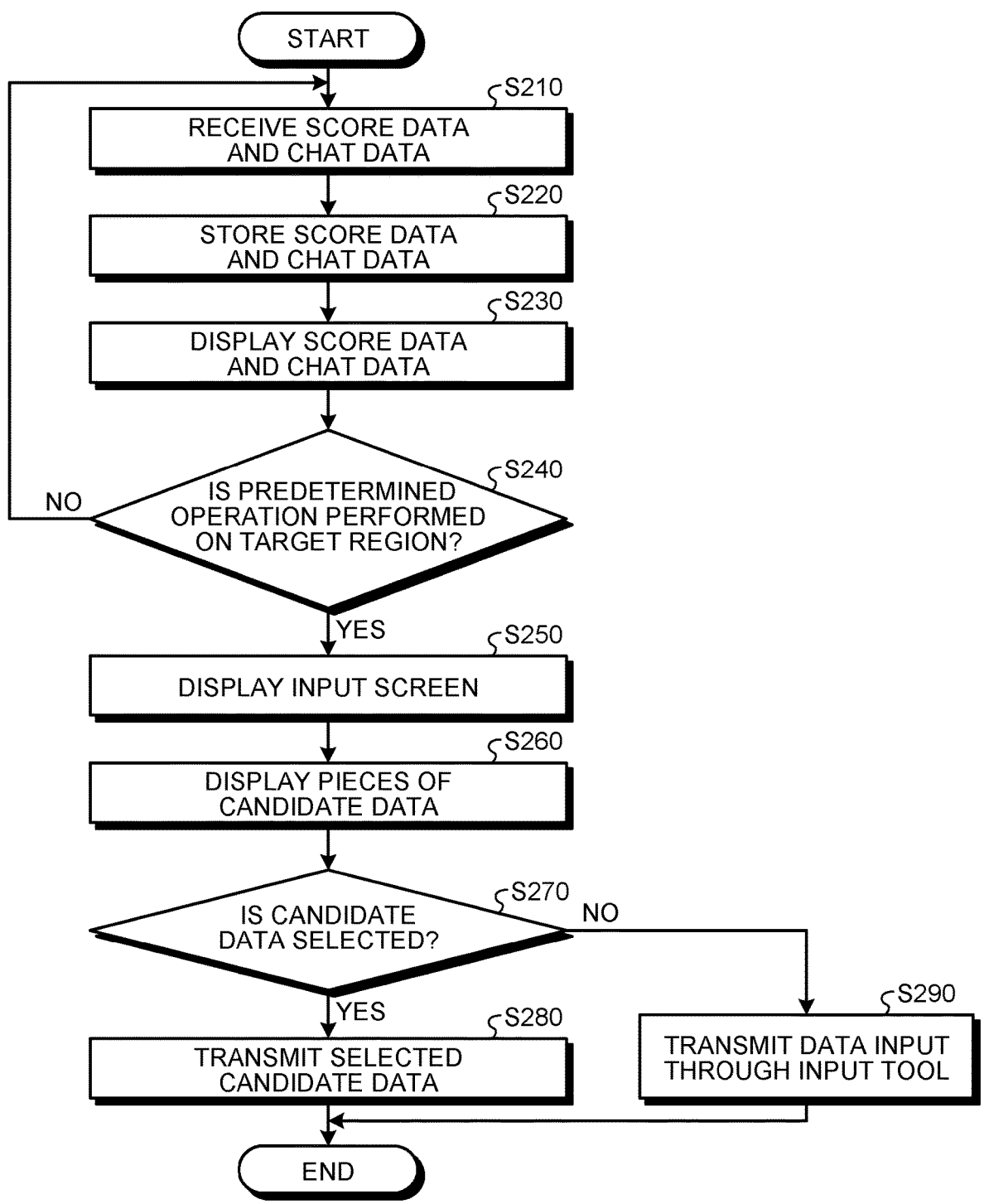
FIG. 20 is a flowchart illustrating an example of a chat input method.

Further, in the present embodiment, the display control unit 63 displays a screen for inputting chat data when a predetermined operation for inputting new chat data is performed by the input unit 41. FIG. 19 is a diagram illustrating an example of an input screen for inputting chat data. As illustrated in FIG. 20, the display control unit 63 displays a chat data input section 191, a candidate data display section 192, and an input tool display section 193 on the display 42.

The candidate data setting unit 164 selects candidate data to be displayed in the candidate data display section 192 among pieces of candidate data stored in the candidate data storage unit 54 in a case where the predetermined operation is performed on a target region 41a in the input unit 41, the target region 41a corresponding to a region in which the chat data is displayed on the display 42. In the present embodiment, the target region 41a is a region in the input unit 41 that overlaps with, for example, the server message 88, the other's message 89, and the user's message 90.

Examples of the predetermined operation include a so-called flick operation which is an operation of moving a touch point TP from inside to outside of the target region 41a. Note that, in FIG. 19, a black dot-shaped touch point TP is illustrated for convenience of explanation, but the touch point TP is not displayed in an actual implementation. In the flick operation, the candidate data setting unit 164 sets the candidate data based on a direction in which the touch point TP is moved. For example, the candidate data setting unit 164 selects phrases having a positive meaning, such as "yeah!", "congratulations", and "that's great", when the touch point TP is moved upward. In addition, the candidate data setting unit 164 can select phrases having a negative meaning such as "it's unfortunate" or "it's screwed up" when the touch point TP is moved downward. In addition, the candidate data setting unit 164 can select phrases having other meanings when the touch point TP is moved leftward or rightward.

Moreover, the candidate data setting unit 164 can set the candidate data based on a speed at which the touch point TP is moved. The candidate data setting unit 164 can select a stronger phrase in a case where the moving speed of the touch point TP in each direction described above is higher than a first threshold value, and can select a weaker phrase in a case where the moving speed of the touch point TP is lower than a second threshold value. The first threshold value and the second threshold value may be the same value or different values.

For example, in a case where the touch point TP is moved upward at a speed higher than the first threshold value, the candidate data setting unit 164 can select a stronger phrase having a positive meaning, such as "it's the best!" or "wonderful!". In addition, in a case where the touch point TP is moved downward at a speed higher than the first threshold, the candidate data setting unit 164 can select a stronger phrase having a negative meaning, such as "there's no hope" or "what are you doing?".

Further, for example, in a case where the touch point TP is moved upward at a speed lower than the second threshold value, the candidate data setting unit 164 can select a slightly weaker phrase having a positive meaning, such as "it's not bad". In addition, in a case where the touch point TP is moved downward at a speed lower than the second threshold, the candidate data setting unit 164 can select a slightly weaker phrase having a negative meaning, such as "that was close".

In order to distinguish the above-described flick operation from a scroll operation performed on the chat display region 42b, for example, an operation for preventing the scroll operation from being performed may be performed before performing the flick operation. Examples of such an operation include an operation of touching the target region 41a to be subjected to the flick operation one or more times, or a long press of the target region 41a.

Further, the candidate data setting unit 164 can select candidate data based on a content of score data. The candidate data setting unit 164 selects or sets candidate data based on the latest score data from a time when the screen for inputting chat data is displayed. In this case, as the candidate data, a phrase related to the latest score data can be selected or set.

Further, the candidate data setting unit 164 can select the candidate data based on registration data that can be registered in the storage unit 344 in advance. Examples of the registration data include a team to which the user belongs, a game participant (player) designated by the user, and score data designated by the user. For example, in a case where a team is registered as the registration data, when score data that is advantageous for the registered team is acquired, the candidate data setting unit 164 selects a phrase for a case where the score is favorable. On the other hand, when score data that is disadvantageous for the registered team is acquired, the candidate data setting unit 164 selects a phrase for a case where the score is unfavorable.

Further, for example, in a case where a player is registered as the registration data, when score data that is advantageous for the registered player is acquired, the candidate data setting unit 164 can select a phrase for a case where the score is favorable, and when score data that is disadvantageous for the registered player is acquired, the candidate data setting unit 164 can select a phrase for a case where the score is unfavorable, similarly to the above. Further, the candidate data setting unit 164 can set, as candidate data, a phrase including a name of the registered player.

Further, for example, in a case where predetermined score data is registered as the registration data, when the registered score data is acquired, the candidate data setting unit 164 selects a phrase corresponding to the registered score data. For example, when a home run is registered as the registration data and home run score data is acquired, the candidate data setting unit 164 can select, as candidate data, a phrase corresponding to the score data, such as "home run!". Moreover, in a case where both a team and a player are registered as the registration data, when a player of the registered team or the registered player hit a home run, the candidate data setting unit 164 can select or set candidate data in which a phrase for a case where the score is favorable, such as "nice home run" or "yeah, home run" and a phrase including the score data are combined with each other. On the other hand, in a case where a player of an opposing team, not the registered team, hit a home run, the candidate data setting unit 164 can select or set candidate data in which a phrase for a case where the score is unfavorable, such as "they got a home run" or "oh, no! it's a home run", and a phrase including the score data are combined with each other. As for the phrases exemplified above as the candidate data, phrases registered in a text input tool or the like mounted on the chat terminal device 340 may be used, or phrases input as chat data may be used.

Next, an operation of the chat system 300 configured as described above will be described. FIG. 20 is a flowchart illustrating an example of a chat input method. In the chat system 300 according to the present embodiment, in the server 30, score data is input through the score input unit 20 as the game progresses, and chat data is input through each of the chat terminal devices 340 and 40A and the like. The server 30 generates chat data based on the score data. The server 30 stores the score data and the chat data so that the chat terminal devices 340 and 40A and the like can receive the score data and the chat data.

In this state, the chat application is started in the chat terminal device 340. By starting the chat application, in the chat terminal device 340, the communication control unit 61 acquires the score data and the chat data from the server 30 (Step S210). When the score data and the chat data are acquired from the server 30, the storage control unit 62 stores the acquired score data and the chat data in the storage unit 344 in association with each other based on the upload time (Step S220). The display control unit 63 displays the score data and the chat data stored in the storage unit 344 on the display 42 (Step S230).

The control unit 345 determines whether the predetermined operation is performed on the target region in the input unit 41 (Step S240). In a case where it is determined that the operation is not performed (No in Step S240), the control unit 345 repeatedly performs the processing from Step S210. In Step S240, in a case where it is determined that the predetermined operation is performed (Yes in Step S240), the display control unit 63 displays the input screen for inputting chat data (Step S250), and displays candidate data in the candidate data display section 192 of the input screen (Step S260). In Step S260, the candidate data setting unit 164 selects or sets the candidate data based on the latest score data from a time when the screen for inputting chat data is displayed.

The control unit 345 determines whether the candidate data displayed on the display 42 is selected (Step S270). For example, in a case where a region in the input unit 41 that overlaps with a display region of the candidate data displayed in the candidate data display section 192 is touched, the control unit 345 determines that the candidate data displayed in the touched region is selected. In a case where it is determined that the candidate data is selected (Yes in Step S270), the communication control unit 61 transmits the selected candidate data as chat data to the server 30 via the communication unit 43 (Step S280). Further, for example, when the region in the input unit 41 that overlaps with a display region of the input tool display section 193 is touched, the control unit 345 can determine that the candidate data is not selected. In a case where it is determined that the candidate data is not selected (No in Step S270), the communication control unit 61 transmits chat data input through an input tool displayed on the input tool display section 193 to the server 30 via the communication unit 43 (Step S290).

As described above, the chat terminal device 340 according to the present embodiment includes: the communication unit 43 that can receive chat data indicating a content of a chat from the server 30 that manages the chat data, and can transmit chat data to the server; the storage unit 344 that stores the chat data acquired through the communication unit 43; the display 42 that can display the chat data; the input unit 41 that includes the touch panel provided in the display 42; and the control unit 345 that causes the display 42 to display, as candidate data, chat data having a content corresponding to a predetermined operation in a case where the predetermined operation is performed on a target region in the touch panel that corresponds to a region in the display 42 where the chat data is displayed.

Further, the chat system 300 according to the present embodiment includes: the server 30 that manages chat data indicating a content of a chat; and the chat terminal device 340 that includes the communication unit 43 that can receive the chat data from the server 30, and can transmit chat data to the server, the storage unit 344 that stores the chat data acquired through the communication unit 43, the display 42 that can display the chat data, the input unit 41 that includes the touch panel provided in the display 42, and the control unit 345 that causes the display 42 to display, as candidate data, chat data having a content corresponding to a predetermined operation in a case where the predetermined operation is performed on a target region in the touch panel that corresponds to a region in which the chat data is displayed in the display 42.

In addition, the chat input method according to the present embodiment includes: receiving chat data indicating a content of a chat from the server 30 that manages the chat data; storing, in the storage unit 344, the received chat data; displaying, as pieces of candidate data, pieces of chat data each having a content corresponding to a predetermined operation on the display 42 in a case where the predetermined operation is performed on a target region in the touch panel provided in the display 42 that can display the chat data, the target region corresponding to a region in the display 42 in which the pieces of chat data are displayed; and transmitting, in a case where one of the pieces of candidate data displayed on the display 42 is selected, the selected candidate data as chat data to the server 30.

In addition, the chat input program according to the present embodiment causes a computer to perform: receiving chat data indicating a content of a chat from the server 30 that manages the chat data; storing, in the storage unit 344, the received chat data; displaying, as pieces of candidate data, pieces of chat data each having a content corresponding to a predetermined operation on the display 42 in a case where the predetermined operation is performed on a target region in the touch panel provided in the display 42 that can display the chat data, the target region corresponding to a region in the display 42 in which the pieces of chat data are displayed; and transmitting, in a case where one of the pieces of candidate data displayed on the display 42 is selected, the selected candidate data as chat data to the server 30.

With this configuration, as the predetermined operation is performed, candidate data having a content corresponding to the predetermined operation is displayed on the display 42, and chat data can be input by selecting one piece of the candidate data. Therefore, the user can easily input chat data in a short time. As a result, it is possible to reduce a time and effort required for the user to input a chat.

In the chat terminal device 340 according to the present embodiment, the predetermined operation is an operation of moving the touch point TP from inside to outside of the target region 41a. Therefore, the candidate data can be displayed with a simple operation.

In the chat terminal device 340 according to the present embodiment, the control unit 345 sets candidate data based on a direction in which the touch point TP is moved. Therefore, different candidate data can be displayed by changing the moving direction of the touch point TP.

In the chat terminal device 340 according to the present embodiment, the control unit 345 sets candidate data based on a speed at which the touch point TP is moved. Therefore, different candidate data can be displayed by changing the moving speed of the touch point TP.

Fourth Embodiment

Figure 21:
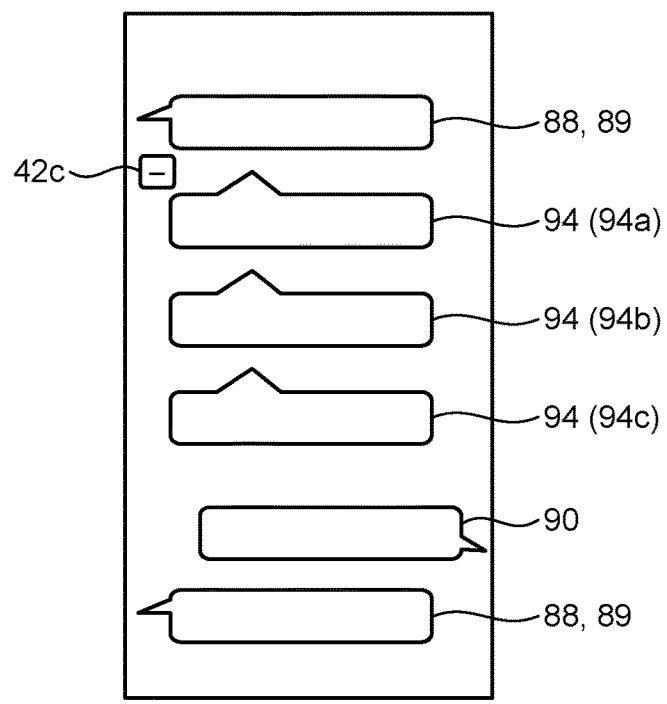
FIG. 21 is a diagram illustrating an example of an input unit and a display of a chat terminal device according to a fourth embodiment.
Figure 22:
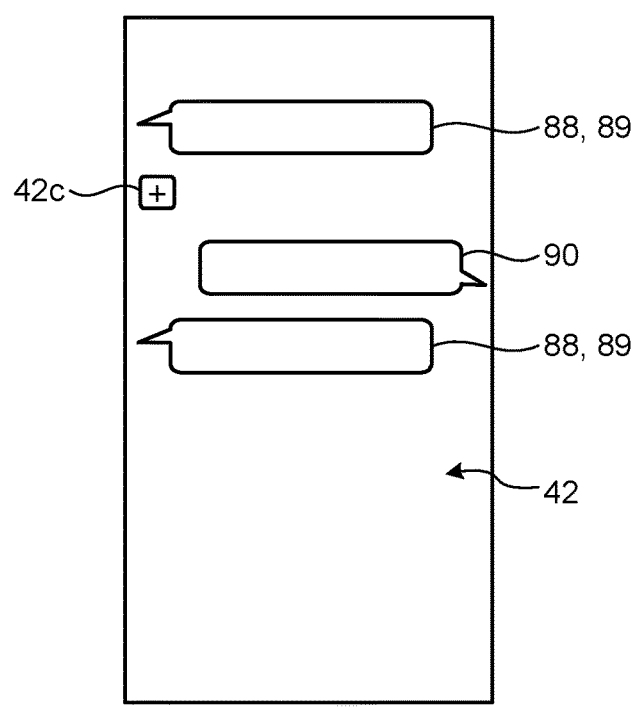
FIG. 22 is a diagram illustrating the example of the input unit and the display of the chat terminal device according to the fourth embodiment.

FIGS. 21 and 22 are diagrams illustrating an example of an input unit 41 and a display 42 of a chat terminal device 340 according to a fourth embodiment. In the present embodiment, a configuration of a chat system 300 including the chat terminal device 340 is similar to that of the third embodiment. In the present embodiment, a form in which a chat display region 42b is displayed is different from that of the third embodiment, and thus the difference will be mainly described.

As illustrated in FIG. 21, when subordinate chat data 94 which is chat data having a content related to one piece of chat data (for example, a server message 88, other's message 89, or a user's message 90) is received via a communication unit 43, a display control unit 63 can display the subordinate chat data 94 on a display 42. Hereinafter, the server message 88 and the other's message 89 will be described as an example of the one piece of chat data, but the chat data is not limited thereto, and the same description can be applied to the user's message 90.

Examples of the subordinate chat data 94 include chat data (a comment and the like) as a reply to one piece of chat data 88 or 89. The display control unit 63 can display the subordinate chat data 94 below the chat data 88 or 89, for example. In a case where a plurality of pieces of subordinate chat data 94 exist for one piece of chat data 88 or 89, the display control unit 63 can display the pieces of subordinate chat data 94 so that subordinate chat data 94 that is uploaded earliest to a server 30 is displayed at the uppermost position, for example. In the example illustrated in FIG. 21, three pieces of subordinate chat data 94a, 94b, and 94c exist for one piece of chat data 88 or 89. These pieces of subordinate chat data 94a, 94b, and 94c are displayed below one piece of chat data 88 or 89, and are also displayed so that subordinate chat data that is uploaded earliest is displayed at the uppermost position.

As illustrated in FIG. 21, the display control unit 63 can display a switching button 42c for performing switching between displaying and hiding of the pieces of subordinate chat data 94 for the chat data 88 or 89 for which the pieces of subordinate chat data 94 exist. The switching between the displaying and hiding of the pieces of subordinate chat data 94 can be performed by touching a region in the input unit 41 that overlaps with the switching button 42c. In the example illustrated in FIG. 21, the switching button 42c is in a display mode in which the pieces of subordinate chat data 94 are displayed. On the other hand, in the example illustrated in FIG. 22, the switching button 42c is in a non-display mode in which the pieces of subordinate chat data 94 are hidden. In the non-display mode, the display control unit 63 does not display the subordinate chat data 94 for one piece of chat data 88 or 89.

Figure 23:
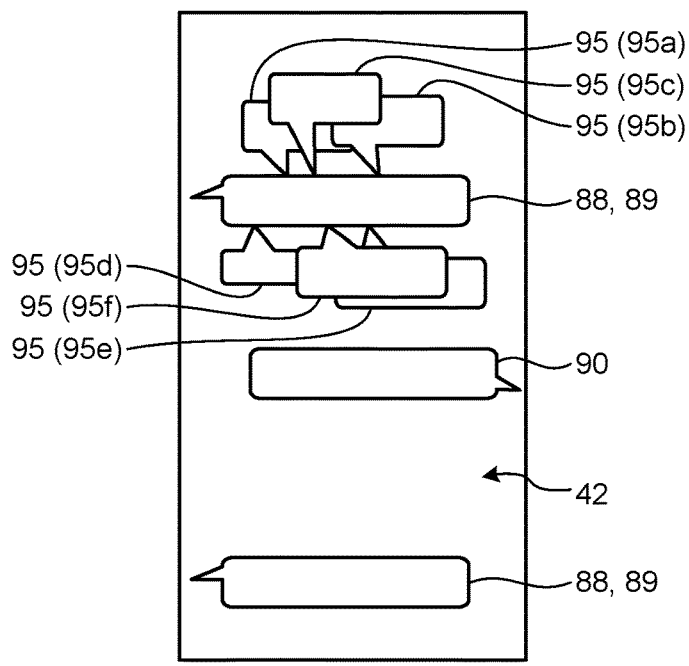
FIG. 23 is a diagram illustrating another example of the input unit and the display of the chat terminal device.

FIG. 23 is a diagram illustrating another example of the input unit 41 and the display 42 of the chat terminal device 340. As illustrated in FIG. 23, the display control unit 63 can perform time-limited displaying for pieces of subordinate chat data 95 such that the pieces of subordinated chat data 95 are displayed around chat data 88 or 89, to which the pieces of subordinate chat data 95 is subordinate, for a predetermined time and then are hidden in the display 42. The display control unit 63 can perform the time-limited displaying in response to a predetermined operation that is input through the input unit 41.

In a case of performing the time-limited displaying, the display control unit 63 can set the predetermined time based on a length of a chat content of each subordinate chat data 95. Alternatively, the display control unit 63 may set the same predetermined time for all pieces of subordinate chat data 95.

In a case where a plurality of pieces of subordinate chat data 95 exist for one piece of chat data 88 or 89, the display control unit 63 can display each of the pieces of subordinate chat data 95 for the predetermined time in a sequence based on an upload time. When displaying the plurality of pieces of subordinate chat data 95, the display control unit 63 may display the next subordinate chat data 95 after one piece of subordinate chat data 95 is hidden, or may display the next subordinate chat data 95 before one piece of subordinate chat data 95 is hidden. Further, the display control unit 63 displays, for example, as illustrated in FIG. 23, the pieces of subordinate chat data 95 (95a to 95f) subordinate to one piece of chat data 88 or 89 in an overlapping form so that subordinate chat data 95 that is displayed latest is positioned on top (displayed side) of the others. In this case, after all pieces of subordinate chat data 95 are displayed, the display control unit 63 may hide all pieces of subordinate chat data 95 at the same timing or from subordinate chat data 95 that is displayed earliest.

Further, for example, in the non-display mode illustrated in FIG. 22, when new subordinate chat data 94 for one piece of chat data 88 or 89 is received, the display control unit 63 may perform the time-limited displaying for the new subordinate chat data 94. In this case, the display control unit 63 can display the subordinate chat data 94 near the chat data 88 or 89 to which the subordinate chat data 94 is subordinate.

Note that, in the present embodiment, a storage unit 344 stores a chat display program that causes a computer to perform: receiving pieces of chat data from the server that manages the pieces of chat data each indicating a content of a chat; storing, in the storage unit 344, the received pieces of chat data in association with a time; displaying the pieces of chat data on the display 42; and performing the time-limited displaying for subordinate chat data that is subordinate to a certain piece of chat data among the pieces of chat data, the time-limited displaying being displaying in which the subordinate chat data is displayed around the certain piece of chat data on the display 42 for a predetermined time and then is hidden.

Figure 24:
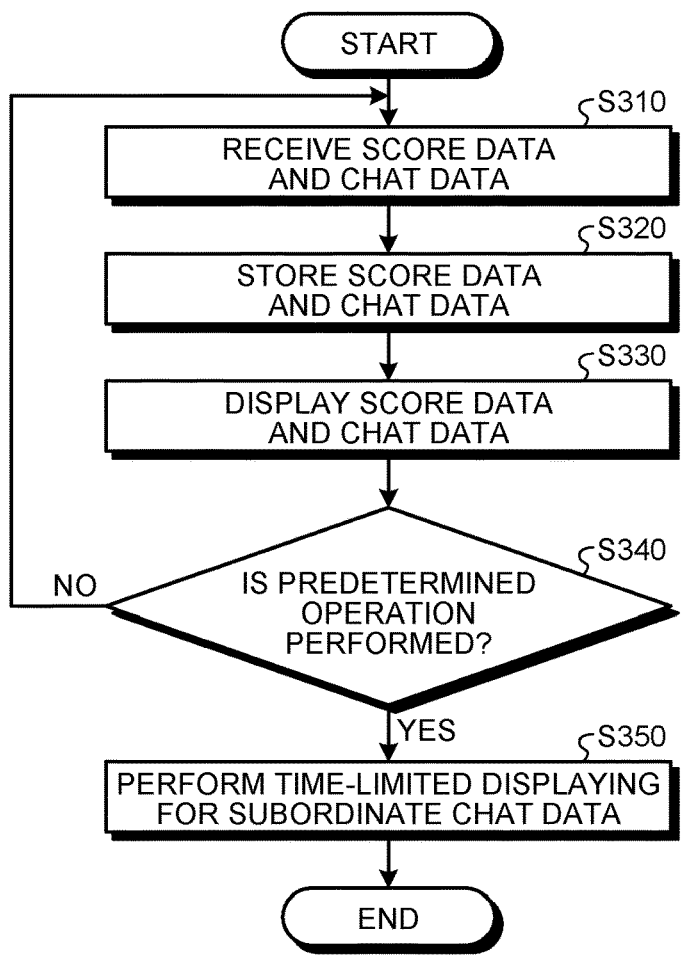
FIG. 24 is a flowchart illustrating an example of a chat display method.

Next, an operation of the chat terminal device 340 according to the fourth embodiment will be described. FIG. 24 is a flowchart illustrating an example of a chat input method. First, in the chat terminal device 340, a chat application is started. By starting the chat application, in the chat terminal device 340, a communication control unit 61 acquires score data and chat data from the server 30 (Step S310). When the score data and the chat data are acquired from the server 30, a storage control unit 62 stores the acquired score data and the chat data in the storage unit 344 in association with each other based on an upload time (Step S320). The display control unit 63 displays the score data and the chat data stored in the storage unit 344 on the display 42 (Step S330).

The control unit 345 determines whether a predetermined operation for performing the time-limited displaying for subordinate chat data 94 (or 95, the same applies hereinafter) is performed (Step S340). In a case where it is determined that the predetermined operation is not performed (No in Step S340), the control unit 345 repeatedly performs the processing from Step S310. In a case where it is determined in Step S340 that the predetermined operation is performed (Yes in Step S340), the display control unit 63 performs the time-limited displaying for the subordinate chat data 94 (Step S350).

As described above, the chat terminal device 340 according to the present embodiment includes: the communication unit 43 configured to receive pieces of chat data each indicating a content of a chat from the server that manages the pieces of chat data and to transmit pieces of chat data to the server; the storage unit 344 configured to store therein the pieces of chat data received through the communication unit 43 in association with a time; the display 42 configured to display the pieces of chat data; and the control unit 345 configured to cause the display 42 to display the pieces of chat data received through the communication unit 43 and to perform the time-limited displaying for subordinate chat data that is subordinate to a certain piece of chat data among the pieces of chat data such that the subordinate chat data is displayed around the chat data of the certain piece of chat data on the display 42 for a predetermined time and then is hidden.

In addition, the chat system according to the present embodiment includes: the server that manages pieces of chat data each indicating a content of a chat; and the chat terminal device 340.

Further, a chat input method according to the present embodiment includes: receiving pieces of chat data each indicating a content of a chat from the server that manages the pieces of chat data; storing, in the storage unit 344, the received pieces of chat data in association with a time; displaying the pieces of chat data on the display 42; and performing the time-limited displaying for subordinate chat data that is subordinate to a certain piece of chat data among the pieces of chat data such that the subordinate chat data is displayed around the certain piece of chat data on the display 42 for a predetermined time and then is hidden.

Further, a chat input program according to the present embodiment causes a computer to perform: receiving pieces of chat data each indicating a content of a chat from the server that manages the pieces of chat data; storing, in the storage unit 344, the received pieces of chat data in association with a time; displaying the pieces of chat data on the display 42; and performing the time-limited displaying for subordinate chat data that is subordinate to a certain piece of chat data among the pieces of chat data such that the subordinate chat data is displayed around the certain piece of chat data on the display 42 for a predetermined time and then is hidden.

With this configuration, subordinate chat data and chat data to which the subordinate chat data is subordinate can be displayed in a distinguishable form. Further, displaying on the display is organized by hiding the subordinate chat data. As a result, the user can easily understand a relationship between the chat data to which the subordinate chat data is subordinate and the subordinate chat data, and easy-to-view displaying can be achieved. In addition, when the user inputs new chat data, independent chat data and subordinate chat data can be separately input.

The chat terminal device 340 according to the present embodiment further includes the input unit 41 through which an operation is input, and the control unit 345 performs the time-limited displaying in response to a predetermined operation that is input through the input unit 41. As a result, subordinate chat data can be displayed at a timing desired by the user.

In the chat terminal device 340 according to the present embodiment, in a case where a plurality of pieces of subordinate chat data exist for a piece of chat data, the control unit 345 displays each of the pieces of subordinate chat data for the predetermined time in a sequence based on a time when each of the pieces of subordinate chat data is stored in the storage unit 344. Accordingly, for example, by displaying the pieces of subordinate chat data 94 in time series, the user can easily understand a time-series relationship among the plurality of pieces of subordinate chat data.

In the chat terminal device 340 according to the present embodiment, the control unit 345 sets the predetermined time based on a length of a chat content of the subordinate chat data. As a result, it is possible to prevent subordinate chat data having a short chat content from being displayed for an excessively long time and shorten a waiting time of the user. In addition, it is possible to prevent a display time of subordinate chat data having a long chat content from being excessively short, and to allow the user to fully understand the chat content.

In the chat terminal device 340 according to the present embodiment, the control unit 345 performs the time-limited displaying in response to reception of the subordinate chat data. As a result, the received subordinate chat data can be displayed in a form that catches the eye of the user.

According to the embodiments, the user can easily grasp information.

Additional aspects of the present disclosure include, but are not limited to:

1. A chat system comprising:
  a chat server; and
  a plurality of chat terminal devices,
  the chat server comprising:
   a server communication unit that is configured to transmit and receive chat data to and from the chat terminal devices;
   a storage unit that stores therein the chat data received through the server communication unit;
   an evaluation point setting unit that sets, in response to a request for setting of an evaluation point for the chat data stored in the storage unit from each of the chat terminal devices, the evaluation point for the chat data based on the request; and
   a chat data processor that stores, in the storage unit, the chat data and evaluation point data indicating the evaluation point in association with each other in response to setting the evaluation point for the chat data stored in the storage unit, and transmits, to each of the chat terminal devices, the chat data and the evaluation point data corresponding to the chat data, and
  each of the chat terminal devices comprising:
   an evaluation point setting requesting unit that transmits the request for setting of the evaluation point for the chat data stored in the storage unit;
   a communication unit that acquires the chat data and the evaluation point data from the chat server; and
   a control unit that causes a display to display the acquired chat data and evaluation point data in an associated manner.

2. The chat system according to the above aspect 1, wherein
  the control unit of each of the chat terminal devices displays, on the display, the chat data in a display form corresponding to the evaluation point.

3. The chat system according to the above aspect 1, wherein
  the control unit of each of the chat terminal devices displays a graph indicating the evaluation point so as to correspond to a display position of the chat data.

4. A chat display method comprising:
  transmitting and receiving, by a chat server, chat data to and from a plurality of chat terminal devices;
  storing, by the chat server, in a storage unit, the chat data received through a server communication unit;
  setting, by the chat server, in response to a request for setting of an evaluation point for the chat data stored in the storage unit from each of the chat terminal devices, the evaluation point for the chat data based on the request;
  storing, by the chat server, in the storage unit, the chat data and evaluation point data indicating the evaluation point in association with each other when the evaluation point is set for the chat data stored in the storage unit;
  transmitting, by the chat server, to the chat terminal, the chat data stored in the storage unit, and transmitting, in response to setting the evaluation point data for the chat data based on the request, the chat data and the evaluation point data corresponding to the chat data to each of the chat terminal devices;
  transmitting, by each of the chat terminal devices, the request for setting of the evaluation point for the chat data stored in the storage unit;
  acquiring, by each of the chat terminal devices, the chat data and the evaluation point data from the chat server; and
  causing, by each of the chat terminal devices, a display to display the acquired chat data and evaluation point data in an associated manner.

5. A recording medium containing a chat data processing program,
  the chat data processing program causing a chat server to perform:
   transmitting and receiving chat data to and from a plurality of chat terminal devices;
   storing, in a storage unit, the chat data received through a server communication unit;
   setting, in response to a request for setting of an evaluation point for the chat data stored in the storage unit from each of the chat terminal devices, the evaluation point for the chat data based on the request;
   storing, in the storage unit, the chat data and evaluation point data indicating the evaluation point in association with each other when the evaluation point is set for the chat data stored in the storage unit; and
   transmitting, to each of the chat terminals, the chat data stored in the storage unit, and transmitting, in response to setting the evaluation point data for the chat data based on the request, the chat data and the evaluation point data corresponding to the chat data to each of the chat terminal devices, and
  the chat data processing program causing each of the chat terminal devices to perform:
   transmitting the request for setting of the evaluation point for the chat data stored in the storage unit;
   acquiring the chat data and the evaluation point data from the chat server; and
   causing a display to display the acquired chat data and evaluation point data in an associated manner.

6. A chat terminal device comprising:
  a communication unit that is configured to receive pieces of chat data each indicating a content of a chat from a server that manages the pieces of chat data and is configured to transmit pieces of chat data to the server;
  a storage unit that stores therein the pieces of chat data received through the communication unit in association with a time;
  a display that is configured to display the pieces of chat data; and
  a control unit that is configured to cause the display to display the pieces of chat data received through the communication unit and is configured to perform time-limited displaying for subordinate chat data that is subordinate to a certain piece of chat data among the pieces of chat data, the time-limited displaying being displaying in which the subordinate chat data is displayed around the certain piece of chat data on the display for a predetermined time and then is hidden.

7. The chat terminal device according to the above aspect 6, further comprising
  an input unit through which an operation is input,
  wherein the control unit performs the time-limited displaying in response to a predetermined operation that is input through the input unit.

8. The chat terminal device according to the above aspect 7, wherein in a case where a plurality of pieces of the subordinate chat data exist for a piece of the chat data, the control unit displays each of the pieces of subordinate chat data for the predetermined time in a sequence based on a time when each of the pieces of subordinate chat data is stored in the storage unit.

9. The chat terminal device according to the above aspect 6, wherein
the control unit sets the predetermined time based on a length of a chat content of the subordinate chat data.

10. The chat terminal device according to the above aspect 6, wherein
the control unit performs the time-limited displaying in response to reception of the subordinate chat data.

11. The chat terminal device according to the above aspect 6, wherein
the control unit is configured to perform switching between displaying and hiding of the subordinate chat data for the chat data for which the subordinate chat data exists.

12. A chat system comprising:
a server that manages pieces of chat data each indicating a content of a chat; and
the chat terminal device according to claim 6.

13. A chat display method comprising:
receiving pieces of chat data each indicating a content of a chat from a server that manages the pieces of chat data;
storing, in a storage unit, the received pieces of chat data in association with a time;
displaying the pieces of chat data on a display; and
performing time-limited displaying for subordinate chat data that is subordinate to a certain piece of chat data among the pieces of chat data, the time-limited displaying being displaying in which the subordinate chat data is displayed around the certain piece of chat data on the display for a predetermined time and then is hidden.

14. A non-transitory computer-readable medium containing a chat display program that causes a computer to perform:
receiving pieces of chat data each indicating a content of a chat from a server that manages the pieces of chat data;
storing, in a storage unit, the received pieces of chat data in association with a time;
displaying the pieces of chat data on a display; and
performing time-limited displaying for subordinate chat data that is subordinate to a certain piece of chat data among the pieces of chat data, the time-limited displaying being displaying in which the subordinate chat data is displayed around the certain piece of chat data on the display for a predetermined time and then is hidden.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A chat system comprising:
a chat server; and
a chat terminal device,
the chat server comprising:
a game situation data acquisition unit that acquires game situation data indicating a situation of a game;
an input information acquisition unit that acquires input information individually input for at least one subject among participants of the game and spectators of the game, the input information including biological information of the subject;
a chat data processor that generates, in response to acquiring the game situation data, situation chat data which is chat data having a content corresponding to the game situation data;
an evaluation point setting unit that acquires an evaluation point setting request including the situation chat data and information on an evaluation point corresponding to the situation chat data, and sets the evaluation point for the situation chat data;
a storage unit that stores therein the situation chat data generated by the chat data processor in association with a time and the information on the evaluation point corresponding to the situation chat data;
an excitement information generation unit that generates, in response to storing the situation chat data in the storage unit, excitement information that indicates a degree of excitement in the game based on the input information acquired at a time corresponding to a time at which the situation chat data is stored in the storage unit and based on the information on the evaluation point, and stores, in the storage unit, the excitement information in association with the situation chat data; and
a server communication unit that is configured to
transmit, to the chat terminal device, the situation chat data stored in the storage unit and the excitement information corresponding to the situation chat data, and
receive the evaluation point setting request from the chat terminal device,
the chat terminal device comprising:
a communication unit that acquires the situation chat data and the excitement information from the chat server, and transmits, to the chat server, the evaluation point setting request for the situation chat data; and
a control unit that causes a display to display the acquired situation chat data and the excitement information in an associated manner.

2. The chat system according to claim 1, wherein
the control unit of the chat terminal device displays, on the display, the situation chat data in a display form corresponding to the excitement information.

3. The chat system according to claim 1, wherein
the control unit of the chat terminal device displays the excitement information so as to correspond to a display position of the situation chat data.

4. A chat display method comprising:
acquiring, by a chat server, game situation data that indicates a situation of a game;
acquiring, by the chat server, input information individually input for at least one subject among participants of the game and spectators of the game, the input information including biological information of the subject;
generating, by the chat server, in response to acquiring the game situation data, situation chat data which is chat data having a content corresponding to the game situation data;
acquiring, by the chat server, an evaluation point setting request including the situation chat data and information on an evaluation point corresponding to the situation chat data, and setting the evaluation point for the situation chat data;
storing, by the chat server, in a storage unit, the generated situation chat data in association with a time and the information on the evaluation point corresponding to the situation chat data;

generating, by the chat server, in response to storing the situation chat data in the storage unit, excitement information that indicates a degree of excitement in the game based on the input information acquired at a time corresponding to a time at which the situation chat data is stored in the storage unit and based on the information on the evaluation point, and storing, in the storage unit, the excitement information in association with the situation chat data; and transmitting, by the chat server, to a chat terminal device, the situation chat data stored in the storage unit and the excitement information corresponding to the situation chat data;

receiving, by the chat server, the evaluation point setting request from the chat terminal device;

acquiring, by the chat terminal device, the situation chat data and the excitement information from the chat server;

transmitting, by the chat terminal device, to the chat server, the evaluation point setting request for the situation chat data; and causing, by the chat terminal device, a display to display the acquired situation chat data and the excitement information in an associated manner.

5. A recording medium containing a chat data processing program, the chat data processing program causing a chat server to perform:

acquiring game situation data that indicates a situation of a game;

acquiring input information individually input for at least one subject among participants of the game and spectators of the game, the input information including biological information of the subject;

generating, in response to acquiring the game situation data, situation chat data which is chat data having a content corresponding to the game situation data;

acquiring an evaluation point setting request including the situation chat data and information on an evaluation point corresponding to the situation chat data, and setting the evaluation point for the situation chat data;

storing, in a storage unit, the generated situation chat data in association with a time and the information on the evaluation point corresponding to the situation chat data;

generating, in response to storing the situation chat data in the storage unit, excitement information that indicates a degree of excitement in the game based on the input information acquired at a time corresponding to a time at which the situation chat data is stored in the storage unit and based on the information on the evaluation point, and storing, in the storage unit, the excitement information in association with the situation chat data; and transmitting, to a chat terminal device, the situation chat data stored in the storage unit and the excitement information corresponding to the situation chat data, and receiving the evaluation point setting request from the chat terminal device;

the chat data processing program causing the chat terminal device to perform:

acquiring the situation chat data and the excitement information from the chat server;

transmitting, to the chat server, the evaluation point setting request for the situation chat data; and causing a display to display the acquired situation chat data and the excitement information in an associated manner.

* * * * *